(12) United States Patent
Chen et al.

(10) Patent No.: US 9,674,855 B2
(45) Date of Patent: Jun. 6, 2017

(54) H-ARQ TIMING DETERMINATION UNDER CROSS-CARRIER SCHEDULING IN LTE

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 13/802,441

(22) Filed: Mar. 13, 2013

(65) Prior Publication Data

US 2013/0258864 A1    Oct. 3, 2013

Related U.S. Application Data

(60) Provisional application No. 61/617,612, filed on Mar. 29, 2012, provisional application No. 61/684,103, filed on Aug. 16, 2012.

(51) Int. Cl.
*H04W 4/00* (2009.01)
*H04W 72/12* (2009.01)
(Continued)

(52) U.S. Cl.
CPC ........... *H04W 72/12* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS 8,385,281 B2    2/2013  Pan et al.
2011/0273994 A1  11/2011  Lin
(Continued)

FOREIGN PATENT DOCUMENTS

WO    2011116365    9/2011
WO    2011143487    11/2011

OTHER PUBLICATIONS

Huawei: "RRC Reconfiguration Issue at Cross-Carrier Scheduling for CA", 3GPP Draft; R1-101941 RRC Reconfiguration Issue at Cross-Carrier Scheduling for CA, 3rd Generation Partnership Project (3GPP), Mobile Competence Centre; 650, Route Des Lucioles; F-06921 Sophia-Antipolis Cedex; France. vol. RAN WG1, No. Beijing, china; 20100412. Apr. 6, 2010 (Apr. 6, 2010), XP050419285, [retrieved on Apr. 6, 2010].
(Continued)

*Primary Examiner* — Jutai Kao
(74) *Attorney, Agent, or Firm* — Harrity & Harrity, LLP

(57) ABSTRACT

Techniques are provided for carrier aggregation and H-ARQ timing in LTE or the like. For example, there is provided a method, operable by a mobile device, that may involve identifying a first component carrier and a second component carrier among a plurality of component carriers to be aggregated, wherein a first number of subframes of a subframe type in the first component carrier is less than a second number of subframes of the same subframe type in the second component carrier. The method may further involve receiving a configuration to monitor a control channel for the second component carrier on the first component carrier. The method further may further involve determining a reference uplink-downlink subframe configuration for the second component carrier based at least in part on the subframe type and the received configuration for the control channel.

30 Claims, 19 Drawing Sheets

(51) Int. Cl.
*H04L 1/18* (2006.01)
*H04L 5/00* (2006.01)

(52) U.S. Cl.
CPC .......... *H04L 1/1887* (2013.01); *H04L 1/1893* (2013.01); *H04L 5/001* (2013.01); *H04W 72/1263* (2013.01)

(56) References Cited

U.S. PATENT DOCUMENTS

| | | | |
|---|---|---|---|
| 2011/0274061 A1 | 11/2011 | Li | |
| 2012/0327821 A1 | 12/2012 | Lin et al. | |
| 2013/0028205 A1 | 1/2013 | Damnjanovic et al. | |
| 2013/0194931 A1* | 8/2013 | Lee et al. | 370/241 |
| 2013/0242819 A1* | 9/2013 | He | H04L 5/1469 370/280 |
| 2014/0098774 A1* | 4/2014 | Gao et al. | 370/329 |
| 2014/0301320 A1* | 10/2014 | Kim | H04L 1/1861 370/329 |
| 2014/0355493 A1* | 12/2014 | Niu | H04L 12/189 370/280 |

OTHER PUBLICATIONS

International Search Report and Written Opinion—PCT/US2013/031675—ISA/EPO—Jun. 24, 2013.
Itri: "Cross-carrier scheduling and HARQ timing for different TDD UL-DL configurations", 3GPP Draft; R1_121700, 3rd Generation Partnership Project (3GPP), Mobile Competence Centre; 658, Route Des Lucioles; F-06921 Sophia-Antipolis Cedex; France, vol. RAN WG1, No. Jeju Island, Korea; 20120326-20120330, Mar. 20, 2012 (Mar. 20, 2012), XP050599271, [retrieved on Mar. 20, 2012].
Qualcomm Incorporated: "Cross-Carrier Scheduling", 3GPP Draft; R1-111673 Cross-Carrier Signalling, 3rd Generation Partnership Project (3GPP), Mobile Competence Centre; 650, Route Des Lucioles ; F-06921 Sophia-Antipolis Cedex; France, vol. RAN WG1, No. Barcelona, Spain; 20110509, May 3, 2011 (May 3, 2011). XP050491295, [retrieved on May 3, 2011].
Zte, "HARQ timing of PDSCH on SCell for TDD CA with different UL-DL configurations", 3GPP Draft; R1-121057, 3rd Generation Partnership Project (3GPP), Mobile Competence Centre; 650, Route Des Lucioles; F-06921 Sophia-Antipolis Cedex; France, vol. RAN WG1. No. Jeju. Korea; 20120326-20120330, Mar. 20, 2012 (Mar. 20, 2012), XP050599360, [retrieved on Mar. 20, 2012].
Fujitsu, "Discussion on PDCCH CIF Design in Cross Carrier Scheduling", 3GPP TSG-RAN WG1 Meeting #62bis, R1-105677, Oct. 6, 2010, 5 pages.
Intel Corporation, "HARQ timing Design for TDD Inter-band Carrier Aggregation", 3GPP TSG-RAN WG1 Meeting #68bis, R1-121530, Mar. 20, 2012, 6 pages.
Itri, "Discussion on enhanced PHICH", 3GPP TSG-RAN WG1 Meeting #68bis, R1-121699, Mar. 20, 2012, 6 pages.
Samsung, "Cross-carrier Scheduling of PUSCH for TDD CA",3GPP TSG-RAN WG1 Meeting #68bis,R1-120160, Jan. 31, 2012, 4 pages.
Samsung, "PUSCH HARQ timing for non-10 ms RTT cases in Pcell", 3GPP TSG-RAN WG1 Meeting #68bis, R1-121614, Mar. 30, 2012, 5 pages.

* cited by examiner

| PDSCH HARQ timing on SCell follows TDD UL-DL configuration # | | Pcell SIB-1 UL-DL Configuration | | | | | | |
|---|---|---|---|---|---|---|---|---|
| | | 0 | 1 | 2 | 3 | 4 | 5 | 6 |
| Scell SIB-1 UL-DL Configuration | 0 |  | 1 | 2 | 3 | 4 | 5 | 6 |
| | 1 | B |  | 2 | C | 4 | 5 | B |
| | 2 | B | B |  | C | C | 5 | B |
| | 3 | B | C | C |  | 4 | 5 | B |
| | 4 | B | B | C | B |  | 5 | B |
| | 5 | B | B | B | B | B |  | B |
| | 6 | B | 1 | 2 | 3 | 4 | 5 |  |
| Notes: The number in the grid is the reference UL-DL configuration which SCell PDSCH HARQ timing follows. | | Case A | Case B | Case C | | | | |

FIG. 7D

| PDSCH HARQ timing on SCell follows TDD UL-DL configuration # | | Pcell SIB-1 UL-DL Configuration | | | | | | |
|---|---|---|---|---|---|---|---|---|
| | | 0 | 1 | 2 | 3 | 4 | 5 | 6 |
| Scell SIB-1 UL-DL Configuration | 0 |  |  |  |  |  |  |  |
| | 1 |  |  |  | 4 |  |  |  |
| | 2 |  |  |  | 5 | 5 |  |  |
| | 3 |  | 4 | 5 |  |  |  |  |
| | 4 |  |  | 5 |  |  |  |  |
| | 5 |  |  |  |  |  |  |  |
| | 6 |  |  |  |  |  |  |  |
| Notes: The number in the grid is the reference UL-DL configuration which SCell PDSCH HARQ timing follows. | | Case A | Case B | Case C | | | | |

FIG. 7E

H-ARQ TIMING DETERMINATION UNDER CROSS-CARRIER SCHEDULING IN LTE

CROSS-REFERENCE TO RELATED APPLICATION

The present Application for patent claims priority to the Provisional Application No. 61/617,612, filed Mar. 29, 2012, and to U.S. Provisional Application No. 61/684,103 filed on Aug. 16, 2012, both entitled "PUCCH FORMAT DEPENDENT H-ARQ TIMING IN LTE", which is assigned to the assignee hereof and hereby expressly incorporated in its entirety by reference herein.

BACKGROUND

Field

Aspects of the present disclosure relate generally to wireless communication systems, and more particularly to hybrid automatic repeat request (H-ARQ) timing in LTE.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

With increased consumer demand for mobile broadband and Internet access, wireless service providers have implemented cellular carrier aggregation to increase the available bandwidth of cellular networks, including LTE and legacy networks. Depending on the subframe types of the component carriers to be aggregated, however, issues with respect to H-ARQ timing may arise. In this context of carrier aggregation, there remains a need for a technique for H-ARQ timing that takes into consideration the characteristics of both primary and secondary component carriers.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for carrier aggregation and hybrid automatic repeat request (H-ARQ) timing operable by a mobile device. The method may involve identifying a first component carrier and a second component carrier among a plurality of component carriers to be aggregated, wherein a first number of subframes of a subframe type in the first component carrier is less than a second number of subframes of the same subframe type in the second component carrier. The method may further involve receiving a configuration to monitor a control channel for the second component carrier on the first component carrier. The method may further involve determining a reference uplink-downlink subframe configuration for the second component carrier based at least in part on the subframe type and the received configuration for the control channel. In related aspects, an electronic device (e.g., a mobile device or component(s) thereof) may be configured to execute the above-described methodology.

In accordance with one or more aspects of the embodiments described herein, there is provided a method for carrier aggregation and H-ARQ timing operable by a network entity, such as, for example, an evolved Node B (eNB) or the like. The method may involve identifying a first component carrier and a second component carrier among a plurality of component carriers to be aggregated, wherein a first number of subframes of a subframe type in the first component carrier is less than a second number of subframes of the same subframe type in the second component carrier. The method may further involve sending, to a mobile device, a configuration to monitor a control channel for the second component carrier on the first component carrier. The method may further involve determining a reference uplink-downlink subframe configuration for the second component carrier based at least in part on the subframe type and the sent configuration for the control channel. In related aspects, an electronic device (e.g., a base station, a core network entity, or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 7D illustrates a reference PDSCH H-ARQ timing on the SCell;

FIG. 7E illustrates another reference PDSCH H-ARQ timing on the SCell;

FIGS. 9A-B illustrate aspects of the an example methodology for H-ARQ timing in LTE or the like;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
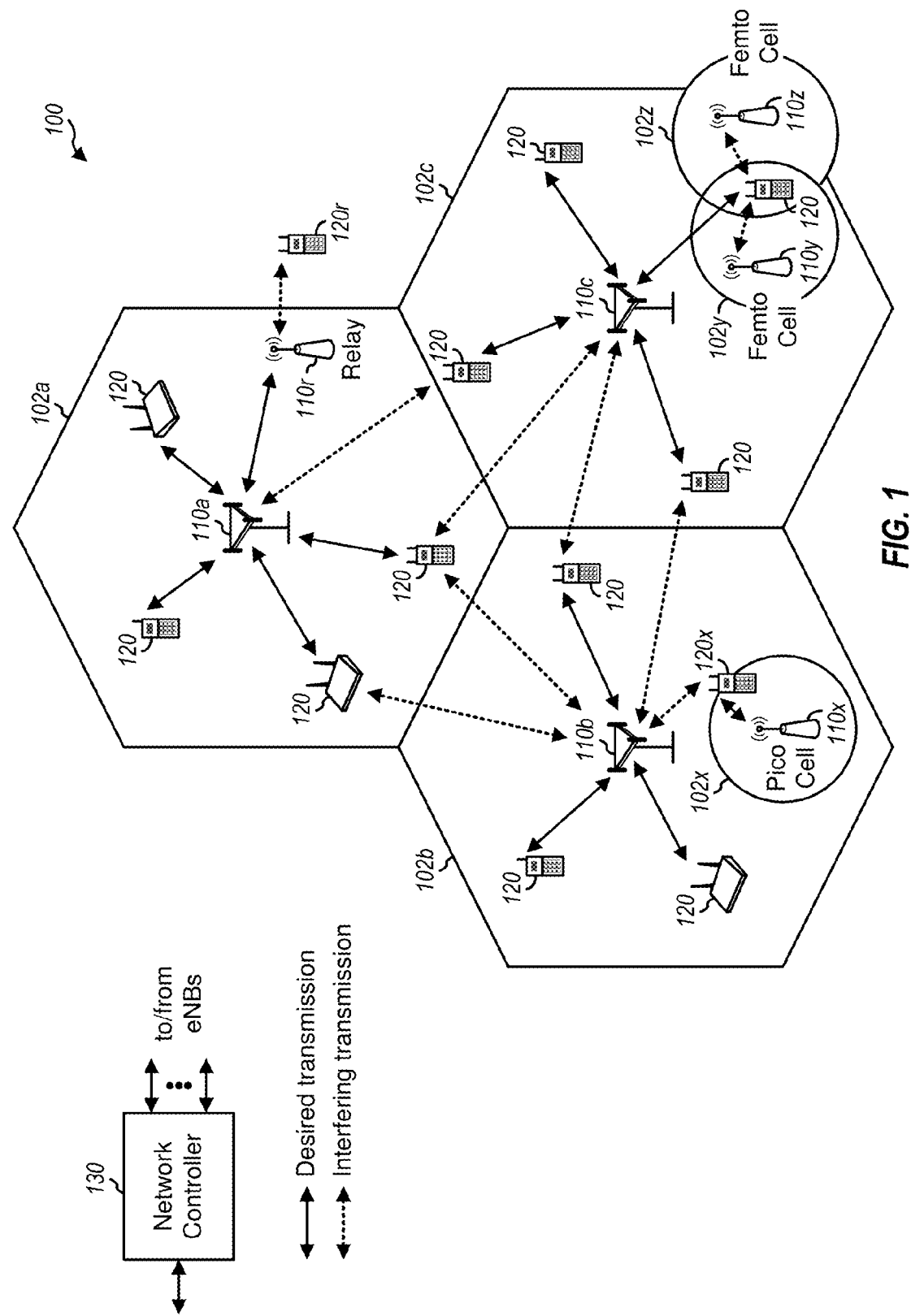
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
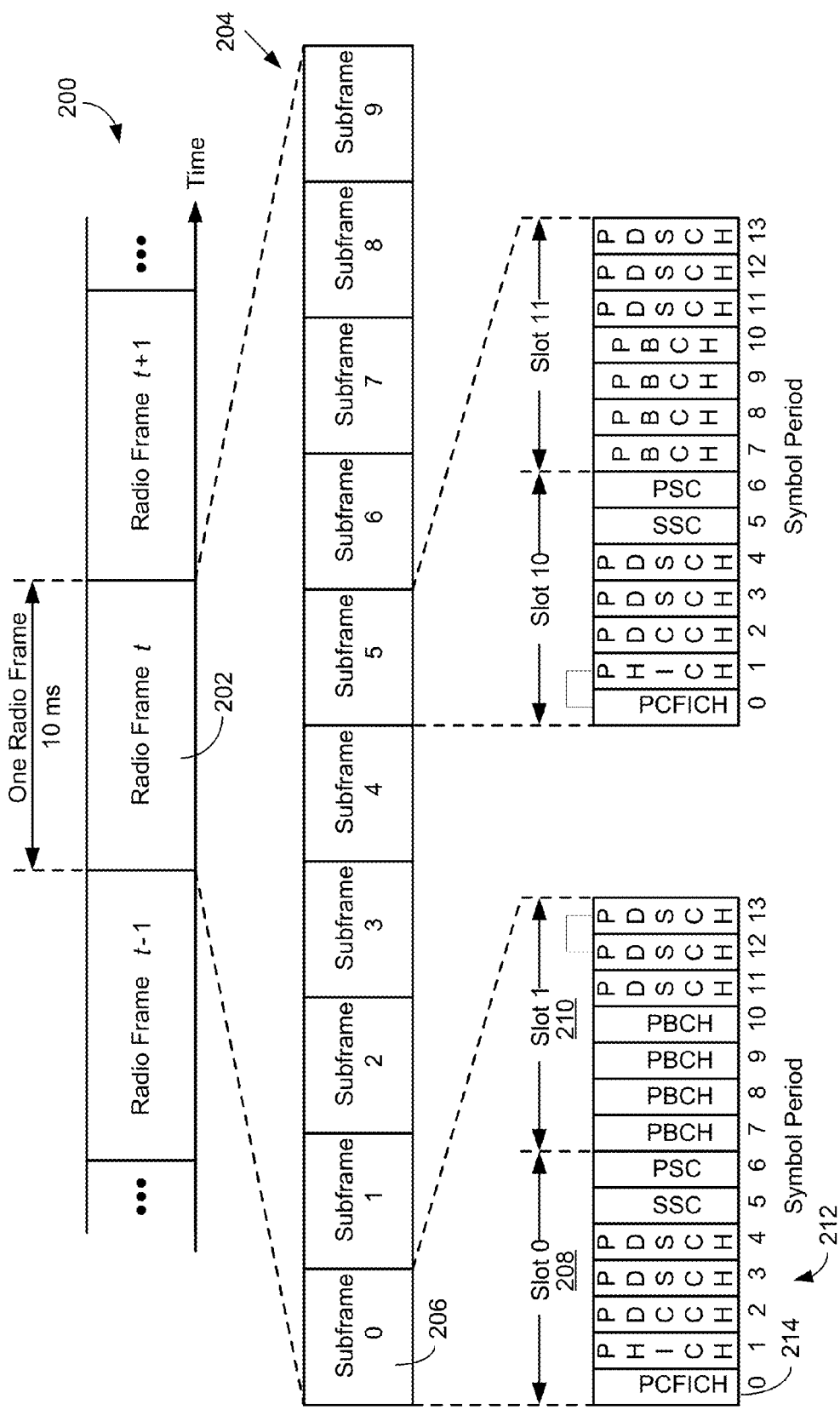
FIG. 2 is a block diagram conceptually illustrating an example of a down link frame structure in a telecommunications system.
Figure 6:
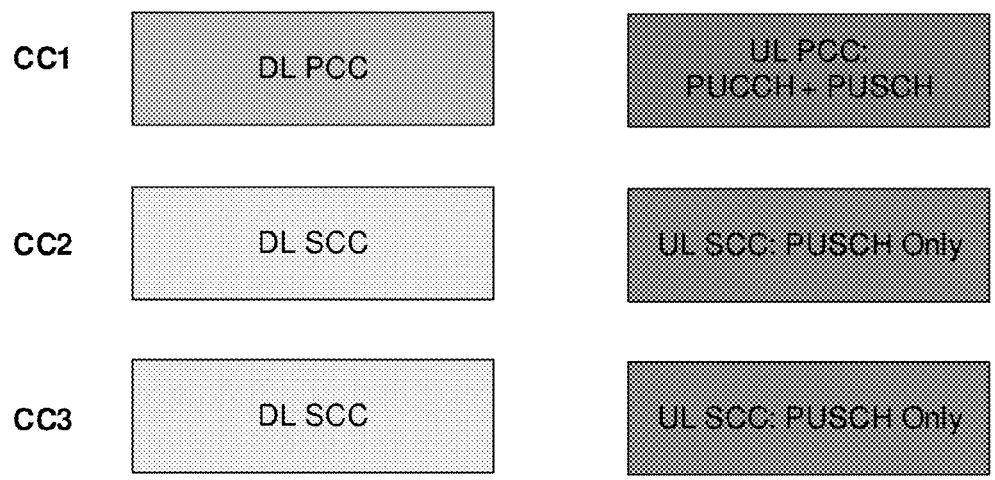
FIG. 6 illustrates component carriers (CC) with downlink and uplink assignments.

FIG. 2 shows a down link frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic repeat request (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
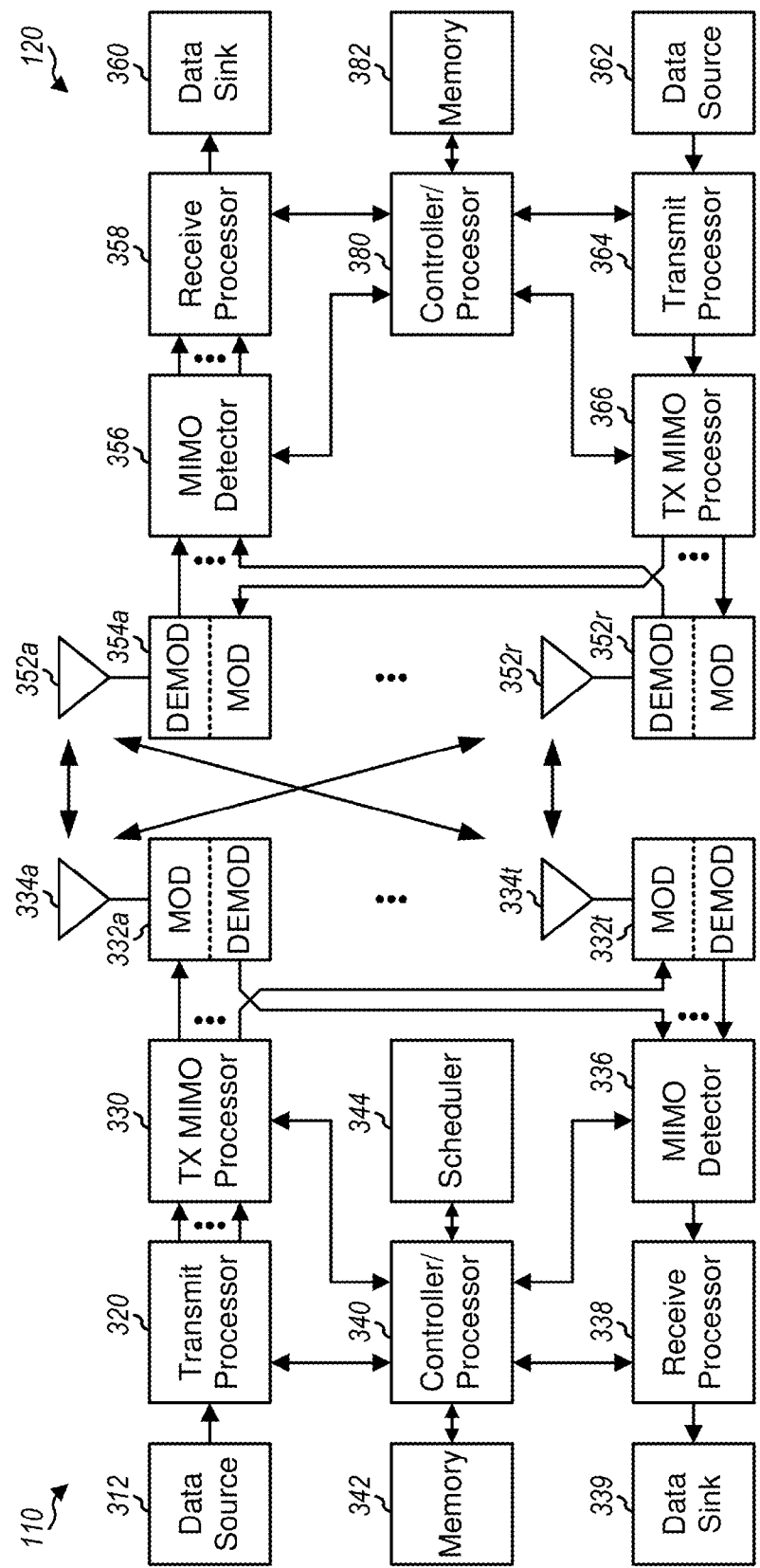
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may include modules for performing operations of the methods described herein, by executing instructions held in the memory 382. Such modules may include, for example, modules for measuring data quality, sensing resource constraints, and providing control signals in a control channel for transmitting to the eNB 110.

On the uplink, at the UE 120, a transmit processor 364 may receive and process data (e.g., for the Physical Uplink Shared Channel (PUSCH)) from a data source 362 and control information (e.g., for the Physical Uplink Control Channel (PUCCH)) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. For example, the processor 380 and/or other processors and modules at the UE 120 may perform or direct the execution of the blocks illustrated in FIGS. 11A-C and/or other processes for the techniques described herein. The UE 120 may include one or more of the components as shown and described in connection with FIG. 12. Likewise, the processor 340 and/or other processors and modules at the base station 110 may perform or direct the execution of the blocks illustrated in FIG. 13 and/or other processes for the techniques described herein. The base station 110 may include one or more of the components as shown and described in connection with FIG. 14. The memories 342 and 382 may store data and program codes for the base station 110 and the UE 120, respectively. A scheduler 344 may schedule UEs for data transmission on the downlink and/or uplink.

Carrier Aggregation

LTE-Advanced UEs use spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

In LTE Rel-10, a UE may be configured with up to 5 component carriers (CC) for (CA). Each CC may use up to 20 MHz and maintain backward compatible. Up to 100 MHz may be configured for a UE. CCs in CA may be involve all Frequency Division Duplex (FDD) or Time Division Duplex (TDD). There is no mixture of FDD & TDD in CA. All TDD CCs may have the same DL:UL configuration, although special subframes may be configured separately for different CCs. One CC may be designated as the primary CC (PCC), which may be the only CC carrying PUCCH and common search space. Other CC(s) may be designated as the secondary CC(s) (SCC).

In LTE Rel-11, aggregation of TDD of different configurations may be supported, allowing more flexibility in deployment. Each CC may be backward compatible for Rel-8/9/10 in the single carrier mode, although it is also possible to introduce non-backward compatible CCs (e.g., carrier segments, extension carriers). In future releases, aggregation of TDD and FDD may be supported.

Carrier Aggregation Types

Figure 4A:
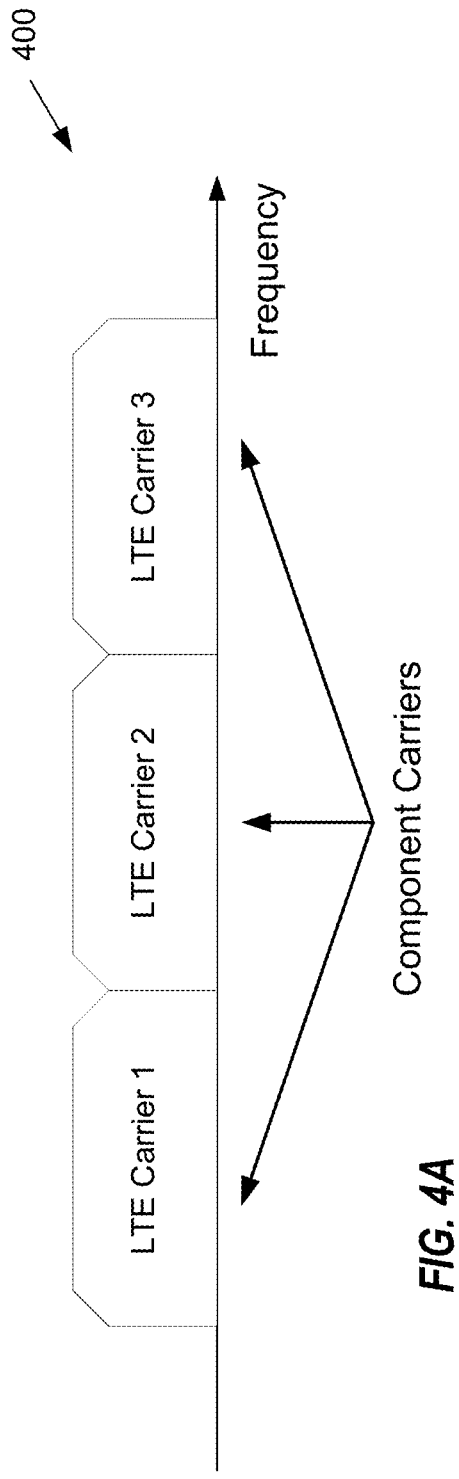
FIG. 4A discloses a contiguous carrier aggregation type.
Figure 4B:
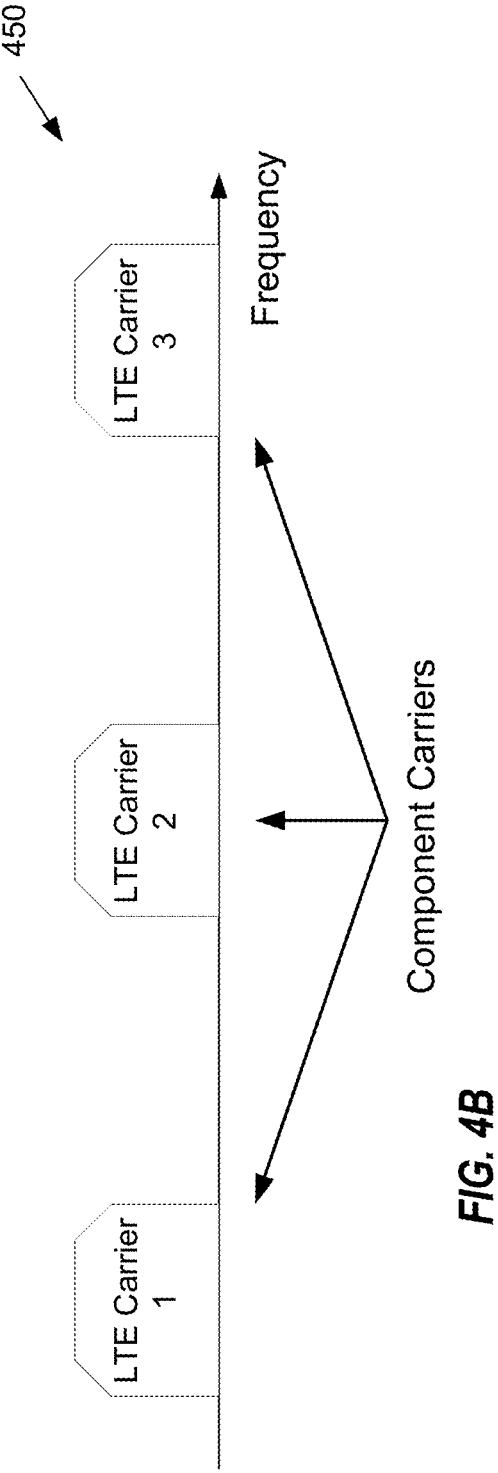
FIG. 4B discloses a non-contiguous carrier aggregation type.

For the LTE-Advanced mobile systems, two types of carrier aggregation (CA) methods have been proposed, contiguous CA and non-contiguous CA. They are illustrated in FIGS. 4A and 4B. Non-contiguous CA 450 refers to configurations wherein multiple available component carriers are separated along the frequency band (FIG. 4B). On the other hand, contiguous CA 400 refers to configurations wherein when multiple available component carriers are adjacent to each other (FIG. 4A). Both non-contiguous and contiguous CA aggregate multiple LTE/component carriers to serve a single unit of LTE Advanced UE.

Multiple RF receiving units and multiple FFTs may be deployed with non-contiguous CA in LTE-Advanced UE since the carriers are separated along the frequency band. Because non-contiguous CA supports data transmissions over multiple separated carriers across a large frequency range, propagation path loss, Doppler shift and other radio channel characteristics may vary a lot at different frequency bands.

Thus, to support broadband data transmission under the non-contiguous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
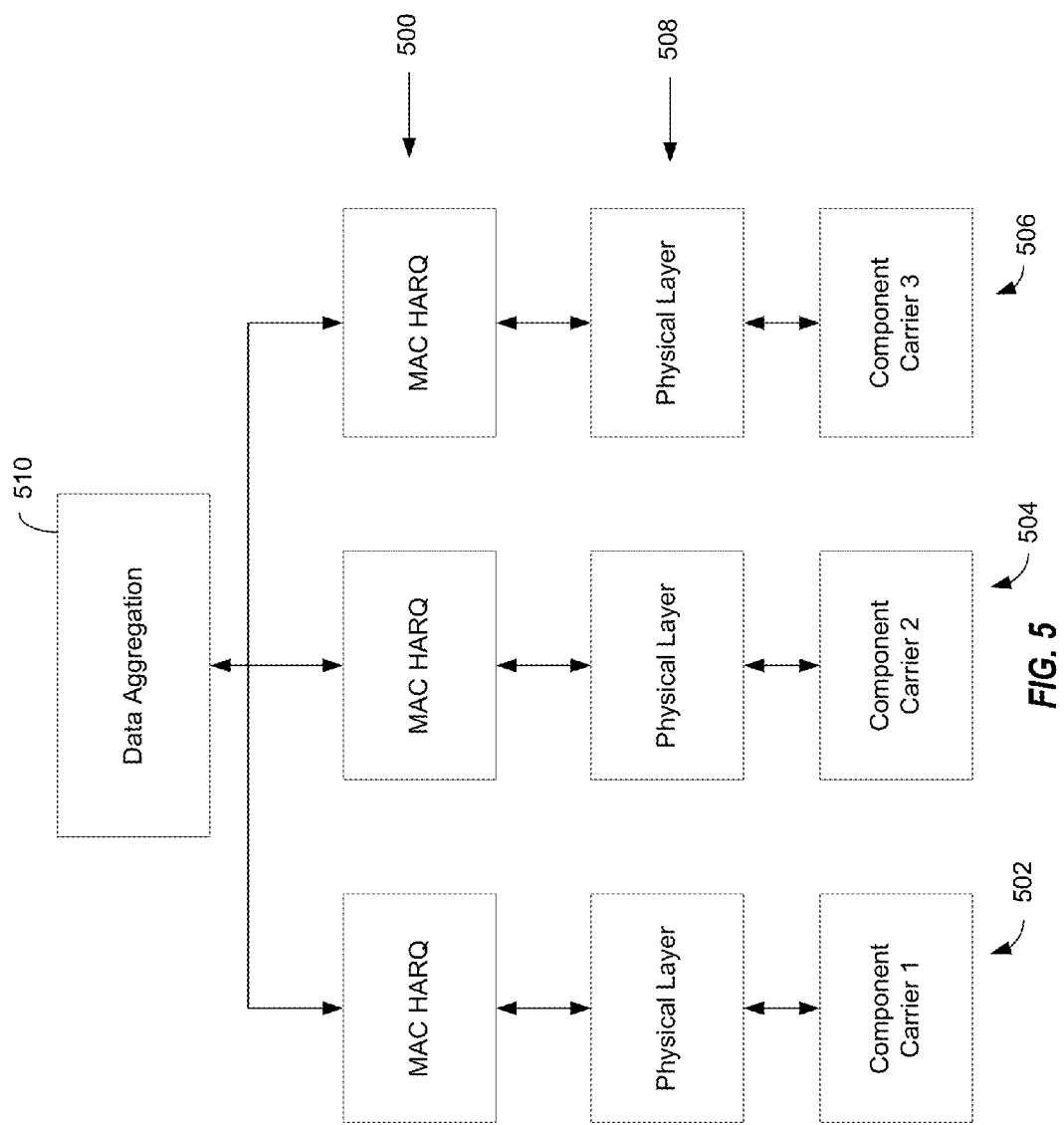
FIG. 5 discloses MAC layer data aggregation.

FIG. 5 illustrates aggregating transmission blocks (TBs) from different component carriers 502, 504, 506 at the medium access control (MAC) layer 500 for an International Mobile Telecommunications-Advanced (IMT-Advanced) system. With MAC layer data aggregation, each component carrier has its own independent H-ARQ entity in the MAC layer 500 and its own transmission configuration parameters (e.g., transmitting power, modulation and coding schemes, and multiple antenna configuration) in the physical layer. Similarly, in the physical layer 508, one H-ARQ entity is provided for each component carrier. A data aggregation process 510 may be performed at the receiver to aggregate data from different component carriers into an aggregated data stream, when the data is directed to a single service or application.

Control Signaling

In general, there are three different approaches for deploying control channel signaling for multiple component carriers. The first involves a minor modification of the control structure in LTE systems where each component carrier is given its own coded control channel.

The second approach involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while CA signaling overhead is reduced.

Multiple control channels for different component carriers are jointly coded and then transmitted over the entire frequency band formed by a third CA approach. This approach offers low signaling overhead and high decoding performance in control channels, at the expense of high power consumption at the UE side. However, this approach is not compatible with LTE systems.

PUCCH Concept

FIG. 6 illustrates component carriers (CC) with downlink and uplink assignments.

Three CCs are illustrated with downlink (DL) and uplink (UL) configurations. CC1 may be a DL PCC and an UL PCC. CC2 and CC3 may be DL SCCs and UL SCCs. Simultaneous acknowledgment/negative acknowledgment (A/N) on PUCCH transmission from one UE on multiple UL CCs may not be supported. A single UE-specific UL CC may be configured semi-statically for carrying PUCCH A/N, scheduling request (SR), and periodic control signaling information (CSI) from a UE—this UL CC may be defined as the UL PCC. Note that this scheme is unrelated to which DL CCs may carry PDCCH for a UE.

CA may include two PUCCH formats. A first format may be PUCCH format 1b with channel selection, including up to 4 bits. If the number of A/N bits to be indicated is less than or equal to 4, then no bundling is used; otherwise, spatial bundling with time-domain bundling is used if the number of A/N bits to be indicated would be greater than 4. A second format may be PUCCH format 3. Format 3 supports A/N payload sizes of up to 20 bits. If the number of A/N bits to be indicated would be greater than 20, spatial bundling may be employed; otherwise, no bundling is employed if the number of A/N bits is less than or equal to 20 bits.

If the UE is configured for PUCCH format 1b with channel selection, the following applies:

PDSCH transmission on the primary cell (PCell) may include implicit A/N resource allocation for dynamic scheduling (based on the starting control channel element (CCE) index of the corresponding PDCCH).

PDSCH transmissions on secondary cells (SCells) may include, for same-carrier scheduling or for cross-carrier scheduling from SCell, explicit 4 A/N resources configured by RRC, and 2-bit transmit power control (TPC) commands re-interpreted as an A/N resource indicator to indicate which one out of the 4 resources may be used. PDSCH transmissions on SCells may include, for cross-carrier scheduling from PCell, an implicit A/N resource allocation, based on the starting CCE index of the corresponding PDCCH.

If the UE is configured for PUCCH format 3, an explicit A/N resource allocation may be configured by radio resource control (RRC). Similarly, PDCCH corresponding to PDSCH on SCell may indicate a resource "A/N Resource Indicator" (ARI) derived from the RRC configured resource(s).

H-ARQ timing and payload size may be as follows:

For FDD, DL scheduling timing (same-frame): PDCCH and the correspondingly scheduled PDSCH may be in the same subframe; and DL H-ARQ timing (4 ms): PDSCH (in subframe n) and the corresponding A/N (in subframe n+4) is fixed at 4 ms apart.

For TDD, DL scheduling timing (same-frame): PDCCH and the correspondingly scheduled PDSCH may be in the same subframe; and DL H-ARQ timing (k>=4 ms): PDSCH (in subframe n) and the corresponding ACK/NAK (in subframe n+k) depends on the DL/UL subframe configuration, the PDSCH subframe.

If the UE is configured for PUCCH format 3, the following applies. Explicit A/N resource allocation may be configured by the RRC. PDCCH corresponding to PDSCH on SCell may indicate a resource "A/N Resource Indicator" (ARI) derived from the RRC configured resource(s). TPC field in the PDCCH corresponding to PDSCH on PCell may be used as TPC command, TPC field (2 bits) in the PDCCH corresponding to PDSCH on SCell may be used as ARI If no PDCCH corresponding to PDSCH on SCells is received and PDSCH is received on the PCell, Rel-8 resource PUCCH 1a/1b may be used. The UE assumes same ARI for all PDCCHs corresponding to PDSCH on SCells. The ARI does not increase the downlink control information (DCI) format size.

For resource allocation for Format 1/1a/1b with Spatial Orthogonal-Resource Transmit Diversity (SORTD) mode: at least for the case of non-channel-selection, SORTD is on if configured by an entity (i.e., by the RRC) with a second resource being determined from $n_{cce}+1$. In another approach, Transmit Diversity (T×D) mode may be implemented in conjunction with channel selection.

TDD CA of Different Configurations

In LTE Rel-11 carrier aggregation, a UE may be configured with two or more cells (each cell having a downlink component carrier and an uplink component carrier), where at least two of the two or more cells in carrier aggregation for the UE have different UL-DL configurations. As an example, a UE may be configured with three cells, two of which have UL-DL configuration #1, and the third cell having UL-DL configuration #2.

Downlink H-ARQ Timing

For PUCCH transmission, the PUCCH may be PCell-only. There may be no new H-ARQ-ACK timing, meaning no new H-ARQ-ACK timing table required beyond those already defined in Rel-8/9/10. Support may be provided for cross-carrier scheduling for UE with different UL-DL configurations between aggregated TDD cells. H-ARQ-ACK timing of PCell PDSCH, scheduling timing of PCell PUSCH, and H-ARQ timing of PCell PUSCH may follow the PCell timing. The PCell timing may be the same as Rel-8/9/10.

Figure 7A:
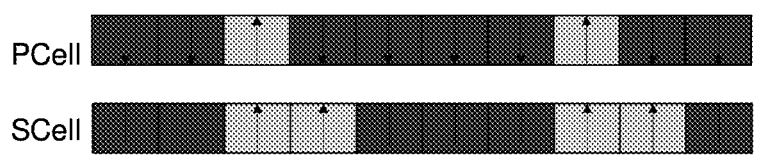
FIG. 7A illustrates a first case (Case A) with secondary cells (SCells) including downlink subframes as a subset of primary cell (PCell) subframes.
Figure 7B:
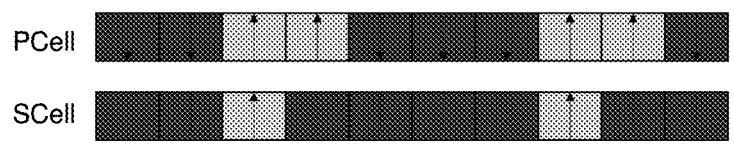
FIG. 7B illustrates a second case (Case B) with secondary cells (SCells) including downlink subframes as a superset of primary cell (PCell) subframes.
Figure 7C:
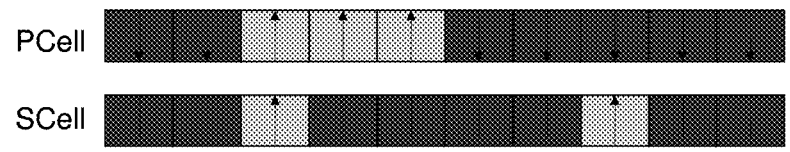
FIG. 7C illustrates a third case (Case C) with secondary cells (SCells) including downlink subframes that are neither a superset nor a subset of primary cell (PCell) subframes.

FIGS. 7A-C illustrate three different cases (Cases A-C) of SCell and PCell subframe configurations. A configuration (or a subframe configuration) may be a downlink and uplink subframe configuration. PDSCH H-ARQ timing on SCell issues may be grouped into three categories. According to the different configurations from the PCell and SCell(s), three different cases may be identified as follows. FIG. 7A illustrates a first case (Case A) with the SCells including downlink subframes as a subset of the PCell subframes. FIG. 7B illustrates a second case (Case B) with the SCells including downlink subframes as a superset of the PCell subframes. FIG. 7C illustrates a third case (Case C) with the SCells including downlink subframes that are neither a superset nor a subset of the PCell subframes.

FIG. 7D illustrates an example reference PDSCH H-ARQ timing on the SCell. For Case A, the PDSCH H-ARQ timing on the SCell may follow the PCell system information block (SIB1) configuration.

For Case B, in the case of self-scheduling (also known as same-carrier scheduling), for full-duplex UEs, the SCell PDSCH H-ARQ timing may follow the SCell H-ARQ timing. For half-duplex UEs, the same design may also apply.

For Case B, in the case of cross-carrier scheduling, two potential approaches include a first approach to follow PCell timing, and a second approach to follow SCell timing.

FIG. 7E illustrates another example reference PDSCH H-ARQ timing on the SCell. For Case C, in the case of same-carrier scheduling, for full duplex UEs, the timing may follow the timing illustrated in FIG. 7E for SCell PDSCH H-ARQ timing. For half duplex UEs, the timing illustrated in FIG. 7E may be utilized.

Downlink H-ARQ Timing Issues

For cross-carrier scheduling in case B, the SCell PDSCH H-ARQ may have two design approaches. A first approach may include using PCell H-ARQ timing. The benefits of the first approach may include re-using Rel-10 design for A/N transmission, and no additional specification effort may be needed. The disadvantages of the first approach may include not all DL transmissions on SCell being scheduled.

A second approach may include using SCell H-ARQ timing. The benefits of the second approach may include all DL subframes on the SCell being scheduled. With respect to the disadvantages, for PUCCH format 1b with channel selection, the SCell H-ARQ timing may be different from PCell H-ARQ timing. As such, the subframe where PDCCH schedules PDSCH on the PCell may be different from the subframe where PDCCH schedules PDSCH on the SCell. If so, an implicit A/N resource allocation based on the starting CCEs of the PDCCHs may be subject to collision or scheduling restriction, because the starting CCEs of the PDCCHs of different subframes may be the same. For PUCCH format 3, there may be no significant issue. Similar issues and/or trade-offs may also occur for Case C with cross-carrier scheduling.

Uplink H-ARQ Timing

Figure 8A:
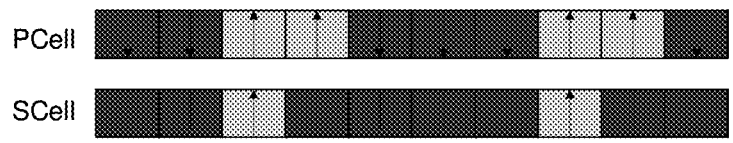
FIGS. 8A-D illustrate four different cases for PUSCH H-ARQ/scheduling timing in the context of uplink H-ARQ timing.
Figure 8B:
Figure 8C:
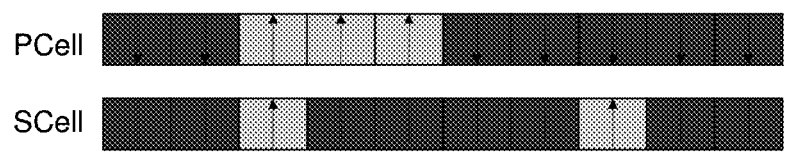
Figure 8D:
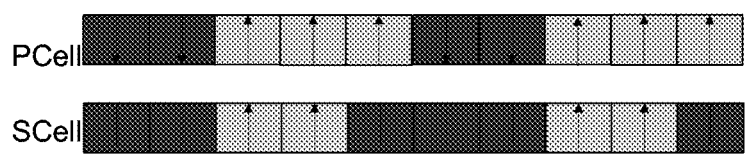

Similarly, according to different configurations from a scheduling cell and a scheduled cell, four different cases for PUSCH HARQ/scheduling timing can be identified. Case A corresponds to the case where UL subframes indicated by the scheduled cell SIB1 configuration are a subset of the UL subframes indicated by the scheduling cell SIB1 configuration and where the PUSCH RTT of the scheduling cell SIB1 configuration is 10 ms, as illustrated in FIG. 8A where the scheduling cell is a PCell and the scheduled cell is a SCell. Case B corresponds to the case where UL subframes indicated by the scheduled cell SIB1 configuration are a superset of the UL subframes indicated by the scheduling cell SIB1 configuration and where the PUSCH RTT of the scheduling cell SIB1 configuration is 10 ms, as illustrated in FIG. 8B where the scheduling cell is a PCell and the scheduled cell is a SCell. Case C corresponds to the case where UL subframes indicated by the scheduled cell SIB1 configuration are neither a superset nor a subset of the UL subframes indicated by the scheduling cell SIB1 configuration and where the PUSCH RTT of the scheduling cell SIB1 configuration is 10 ms, as illustrated in FIG. 8C where the scheduling cell is a PCell and the scheduled cell is a SCell. Case D corresponds to the case where PUSCH RTT of the scheduling cell SIB1 configuration is not 10 ms, as illustrated in FIG. 8D where the scheduling cell is a PCell and the scheduled cell is a SCell.

For Case A, PUSCH HARQ/scheduling timing on the scheduled SCell may follow that of the scheduling cell SIB1 configuration.

For Cases B and C, in the case of self-scheduling (also known as same-carrier scheduling), for full-duplex UEs, PUSCH HARQ/scheduling timing on the scheduled SCell may follow the scheduled cell H-ARQ timing. For half-duplex UEs, the same design may also apply.

For Cases B and C, in the case of cross-carrier scheduling, two potential approaches include a first approach to follow the scheduling cell timing, and a second approach to follow the scheduled cell timing Uplink H-ARQ Timing Issues For cross-carrier scheduling in Cases B and C, PUSCH HARQ/scheduling timing on the scheduled SCell may have two design approaches. A first approach may include using the scheduling cell (e.g., PCell) H-ARQ timing. The benefits of the first approach may include re-using Rel-10 design for A/N transmission, and no additional specification effort may be needed. The disadvantages of the first approach may include not all UL transmissions on the scheduled cell being scheduled.

A second approach may include using the scheduled cell's PUSCH HARQ/scheduling timing. The benefits of the second approach may include all UL subframes on the scheduled cell being scheduled. With respect to the disadvantages, PHICH for non-adaptive PUSCH re-transmissions may not be available for some subframes.

Solutions for H-ARQ Timing Issues

In one embodiment, for cross-carrier scheduling in Case B, the SCell PDSCH H-ARQ timing may be PUCCH format dependent. In particular, the SCell PDSCH H-ARQ timing may be determined as follows:

Use PCell H-ARQ timing if PUCCH format 1b with channel selection is configured for the UE. In this case, R10 design for A/N transmission may be re-used, and no additional specification effort may be needed. All DL transmissions on the SCell may or may not be scheduled; but for this case, the DL peak throughput may not be a major concern.

Use SCell H-ARQ timing if PUCCH format 3 is configured for the UE. All DL subframes on SCell may be scheduled. The DL peak throughput may be realized.

With the above design, minimum specification impact may be achieved, while it is still possible to realize maximum DL throughput. In addition, PUCCH format 3 may be designed to maximize downlink throughput, while PUCCH format 1b with channel selection may be designed for more efficient uplink overhead transmission where some comprise in downlink throughput is expected. Similar designs may be done for Case C with cross-carrier scheduling. For example, the SCell H-ARQ timing may be dependent on the configured PUCCH format.

In one embodiment, for cross-carrier scheduling in Case B, different handlings may be done for downlink timing and for uplink timing. In particular, for a scheduled cell's PDSCH, the scheduled cell's PDSCH H-ARQ timing may follow the one specified for the scheduling cell; for a scheduled cell's PUSCH, the scheduled cell's PUSCH H-ARQ/scheduling timing may follow the one specified for the scheduled cell. In other words, the scheduling/H-ARQ timing may depend on a subframe type, where the subframe type can be downlink subframes (including special subframes where downlink transmissions may occur), or uplink subframes. In Case B, the set of subframes of a subframe type (downlink or uplink) in the scheduling cell is a subset of the set of subframes of the same subframe type in the second component. Under cross-carrier scheduling, the scheduling/H-ARQ timing for the scheduled cell may depend on the subframe type. If the subframe type is downlink, the scheduled cell's PDSCH H-ARQ timing may follow that for a first UL-DL subframe configuration (e.g., the scheduling cell). If the subframe type is uplink, the scheduled cell's PUSCH H-ARQ/scheduling timing may follow that for a second UL-DL subframe configuration (e.g., the scheduled cell).

With the above design, minimum specification impact may be achieved, while it is still possible to realize maximum uplink throughput. The issue of non-availability of PHICH for the scheduled cell can be easily handled the same way as in the case of relaying backhaul, where a corresponding uplink re-transmission can be suspended. Similar designs may be done for Case C with cross-carrier scheduling. For example, the SCell H-ARQ timing may be dependent on the subframe type.

Example Methodologies and Apparatuses

Figure 9A:
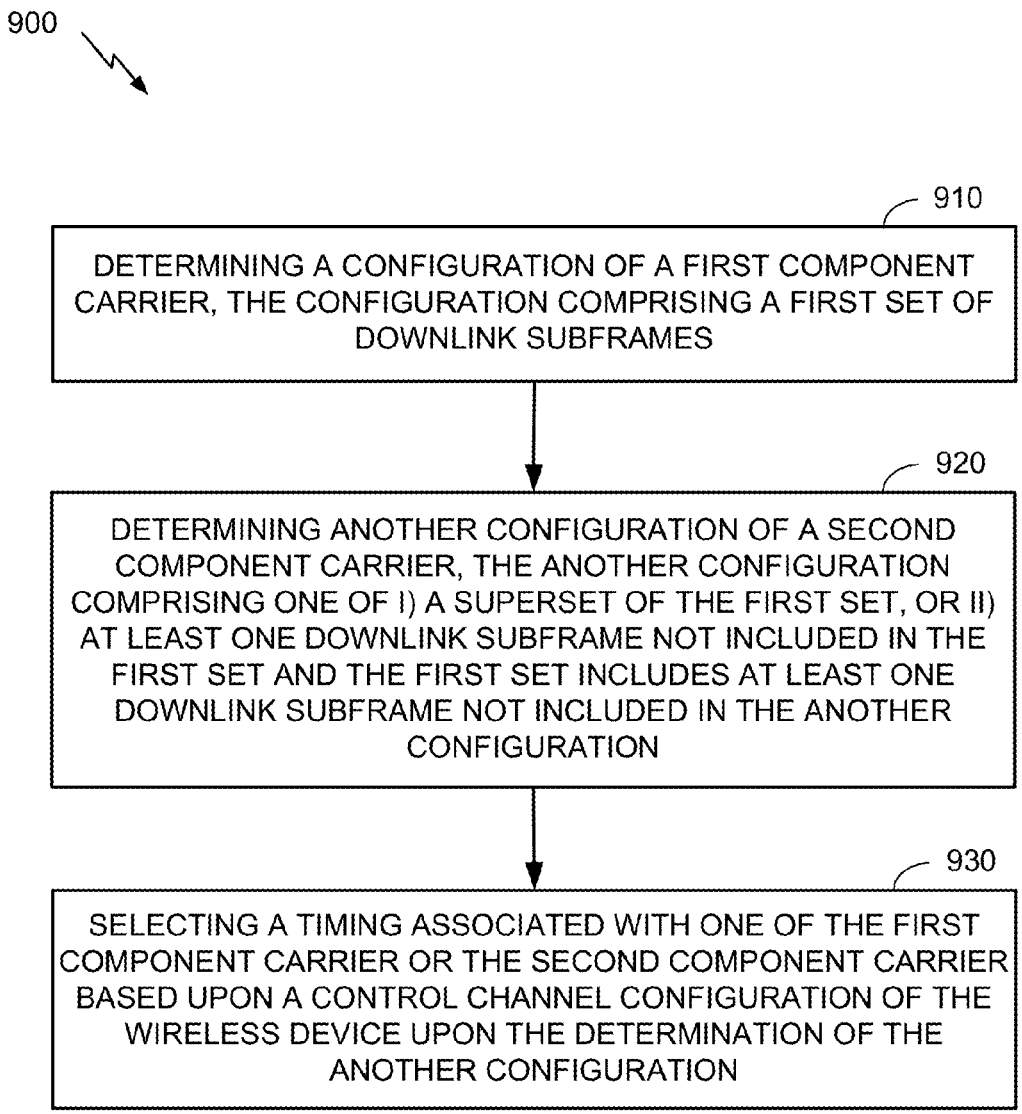

In accordance with one or more aspects of the embodiments described herein, with reference to FIG. 9A, there is shown a methodology 900, operable by a wireless entity, such as, for example, a user equipment, wireless device, wireless terminal, mobile device, or the like. Specifically, method 900 describes H-ARQ timing in LTE or the like. The method 900 may involve, at 910, determining a configuration of a first component carrier, the configuration comprising a first set of downlink subframes. The method 900 may involve, at 920, determining another configuration of a second component carrier, the another configuration comprising one of i) a superset of the first set, or ii) at least one downlink subframe not included in the first set and the first set includes at least one downlink subframe not included in the another configuration. Further, the method may involve, at 930, selecting a timing associated with one of the first component carrier or the second component carrier based upon a control channel configuration of the wireless device upon the determination of the another configuration. For example, the first component carrier may be a primary component carrier (PCC) and the second component carrier may be a secondary component carrier (SCC). The PCC (or PCell) timing may be selected for the downlink subframes, e.g., in the PDSCH, for any number of aggregated CCs, and the scheduled cell (e.g., the SCC) timing may be selected for the uplink subframes, e.g., in the PUSCH. In another example, the scheduled cell timing may be selected for the downlink subframes, e.g., in the PDSCH, and the scheduled cell timing may be selected for the uplink subframes, e.g., in the PUSCH.

Figure 9B:
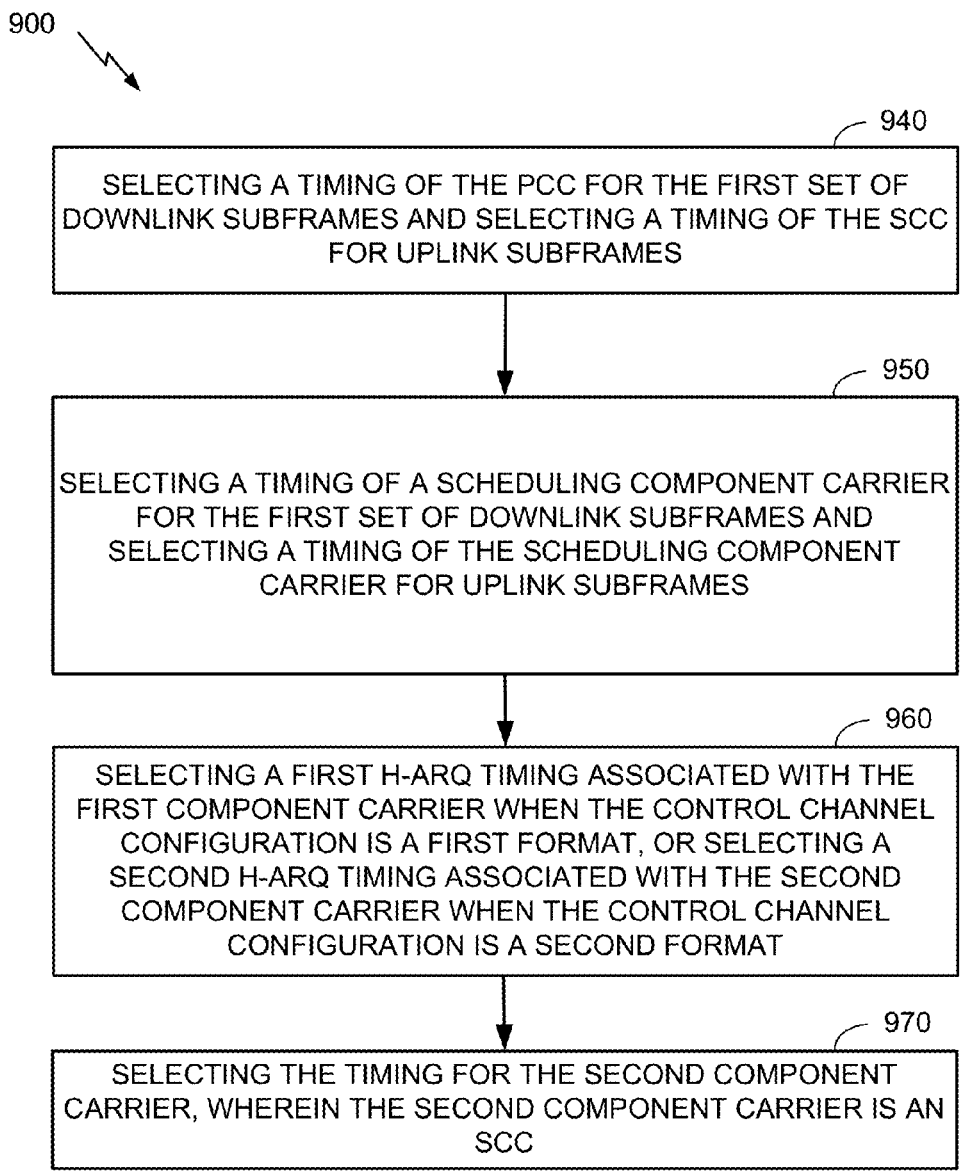

Additional operations for H-ARQ timing are illustrated in FIG. 9B. One or more of the operations in FIG. 9B may optionally be performed as part of method 900. The elements in FIG. 9B may be performed in any operative order, or may be encompassed by a development algorithm without requiring a particular chronological order of performance. Operations are independently performed and not mutually exclusive. As such, any one of such operations may be performed regardless of whether another downstream or upstream operation is performed. For example, if the method 900 includes at least one of the operations of FIG. 9B, then the method 900 may terminate after the at least one operation, without necessarily having to include any subsequent downstream operation(s) that may be illustrated.

Referring to FIG. 9B, the additional operations may include, at 940, selecting a timing of the PCC for the first set of downlink subframes and selecting a timing of the SCC for uplink subframes. The additional operations may include, at 950, selecting a timing of a scheduling component carrier for the first set of downlink subframes and selecting a timing of the scheduling component carrier for uplink subframes. The additional operations may include, at 960, selecting a first H-ARQ timing associated with the first component carrier when the control channel configuration is a first format, or selecting a second H-ARQ timing associated with the second component carrier when the control channel configuration is a second format. The additional operations may include, at 970, selecting the timing for the second component carrier, wherein the second component carrier is an SCC.

Figure 10A:
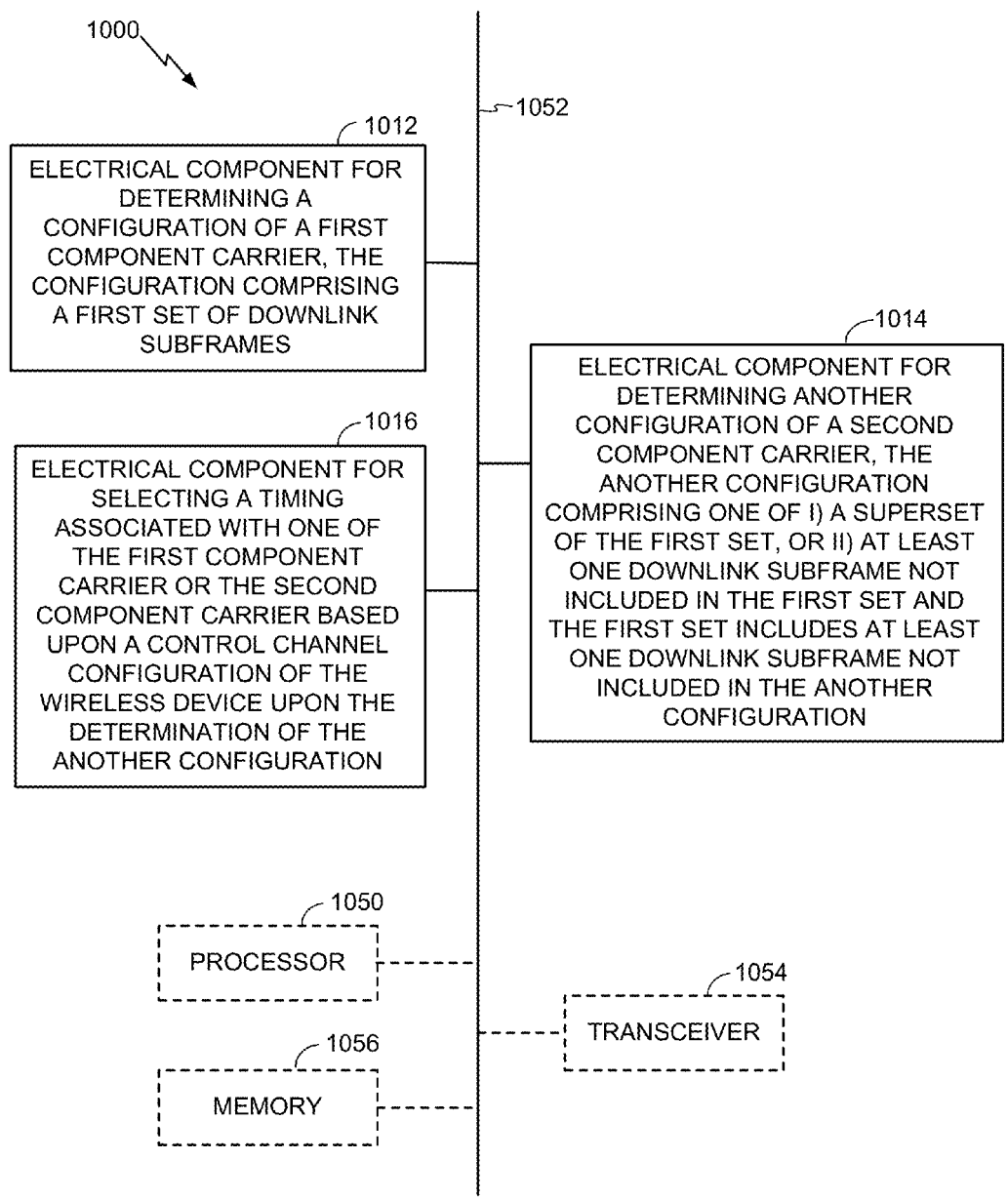
FIGS. 10A-B show embodiments of an apparatus for H-ARQ timing, in accordance with the methodologies of FIGS. 9A-B.
Figure 10B:
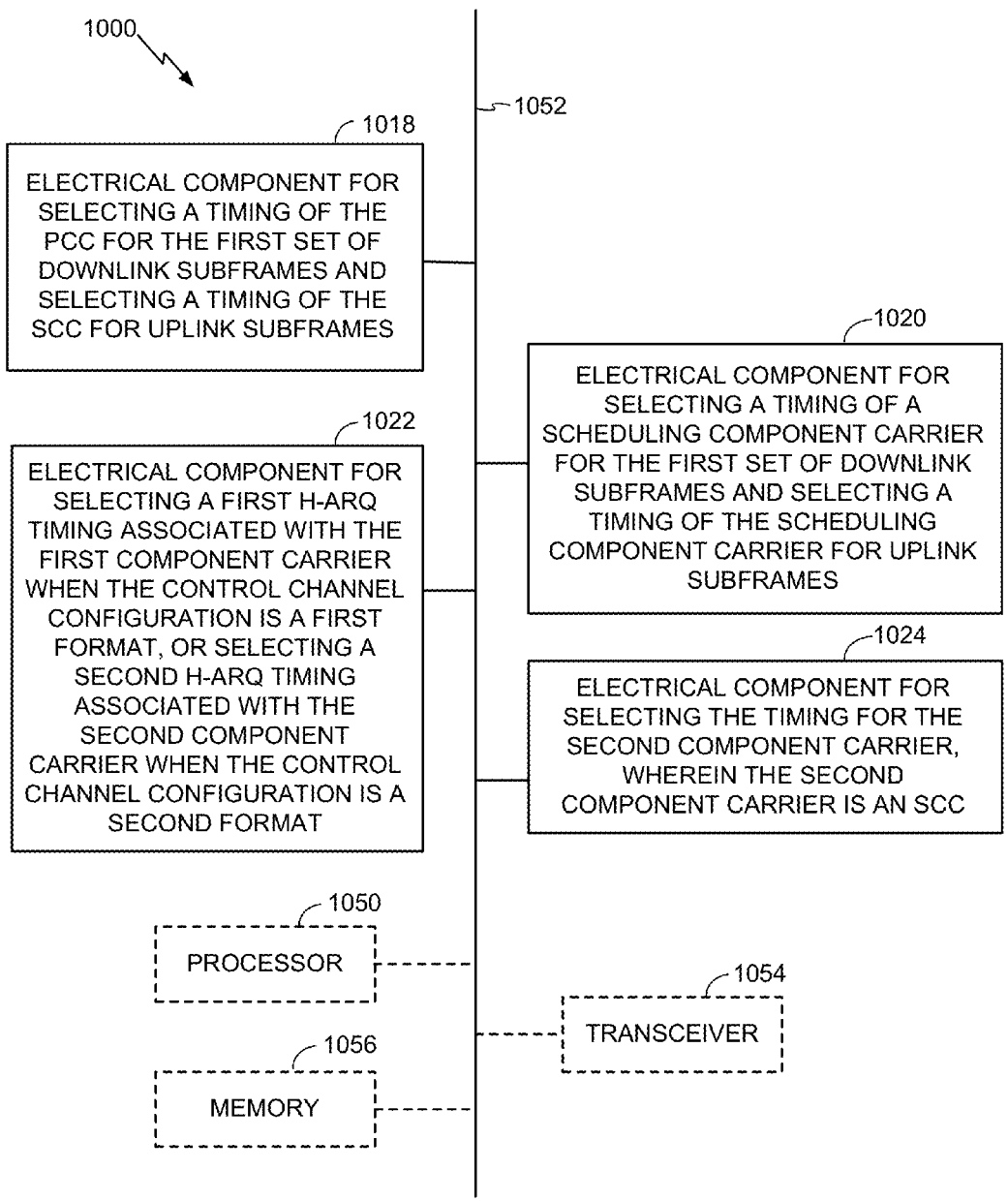

FIGS. 10A-B shows embodiments of an apparatus for H-ARQ timing, in accordance with the methodologies of FIGS. 9A-B. With reference to FIG. 10A, there is provided an exemplary apparatus 1000 that may be configured as a wireless entity (e.g., a user equipment, wireless device, wireless terminal, mobile device, or the like) in a wireless network, or as a processor or similar device/component for use within the wireless entity. The apparatus 1000 may include functional blocks that represent functions implemented by a processor, software, or combination thereof (e.g., firmware). For example, the apparatus 1000 may include an electrical component or module 1012 for determining a configuration of a first component carrier, the configuration comprising a first set of downlink subframes. The apparatus 1000 may also include a component 1014 for determining another configuration of a second component carrier, the another configuration comprising one of i) a superset of the first set, or ii) at least one downlink subframe not included in the first set and the first set includes at least one downlink subframe not included in the another configuration. The apparatus 1000 may also include a component 1016 for selecting a timing associated with one of the first component carrier or the second component carrier based upon a control channel configuration of the wireless device upon the determination of the another configuration. For example, the first component carrier may be a primary component carrier (PCC) and the second component carrier may be a secondary component carrier (SCC). The PCC (or PCell) timing may be selected for the downlink subframes, e.g., in the PDSCH, for any number of aggregated CCs, and the scheduled cell (e.g., the SCC) timing may be selected for the uplink subframes, e.g., in the PUSCH. In another example, the scheduled cell timing may be selected for the downlink subframes, e.g., in the PDSCH, and the scheduled cell timing may be selected for the uplink subframes, e.g., in the PUSCH.

In related aspects, the apparatus 1000 may optionally include a processor component 1050 having at least one processor, in the case of the apparatus 1000 configured as a wireless entity (e.g., a user equipment, wireless device, wireless terminal, mobile device, or the like), rather than as a processor. The processor 1050, in such case, may be in operative communication with the components 1012-1016 via a bus 1052 or similar communication coupling. The processor 1050 may effect initiation and scheduling of the processes or functions performed by electrical components 1012-1016.

In further related aspects, the apparatus 1000 may include a radio transceiver component 1054. A stand alone receiver and/or stand alone transmitter may be used in lieu of or in conjunction with the transceiver 1054. When the apparatus 1000 is a wireless entity, the apparatus 1000 may also include a network interface (not shown) for connecting to one or more core network entities. The apparatus 1000 may optionally include a component for storing information, such as, for example, a memory device/component 1056. The computer readable medium or the memory component 1056 may be operatively coupled to the other components of the apparatus 1000 via the bus 1052 or the like. The memory component 1056 may be adapted to store computer readable instructions and data for effecting the processes and behavior of the components 1012-1016, and subcomponents thereof, or the processor 1050, or the methods disclosed herein. The memory component 1056 may retain instructions for executing functions associated with the components 1012-1016. While shown as being external to the memory 1056, it is to be understood that the components 1012-1016 can exist within the memory 1056. It is further noted that the components in FIG. 10A may comprise processors, electronic devices, hardware devices, electronic sub-components, logical circuits, memories, software codes, firmware codes, etc., or any combination thereof.

With reference to FIG. 10B, there are shown further optional components or modules of the apparatus 1000. For example, the apparatus 1000 may further include an electrical component or module 1018 for selecting a timing of the PCC for the first set of downlink subframes and selecting a timing of the SCC for uplink subframes. For example, the apparatus 1000 may further include an electrical component or module 1020 for selecting a timing of a scheduling component carrier for the first set of downlink subframes and selecting a timing of the scheduling component carrier for uplink subframes. For example, the apparatus 1000 may further include an electrical component or module 1022 for selecting a first H-ARQ timing associated with the first component carrier when the control channel configuration is a first format, or selecting a second H-ARQ timing associated with the second component carrier when the control channel configuration is a second format. For example, the apparatus 1000 may further include an electrical component or module 1024 for selecting the timing for the second component carrier, wherein the second component carrier is an SCC.

Figure 11A:
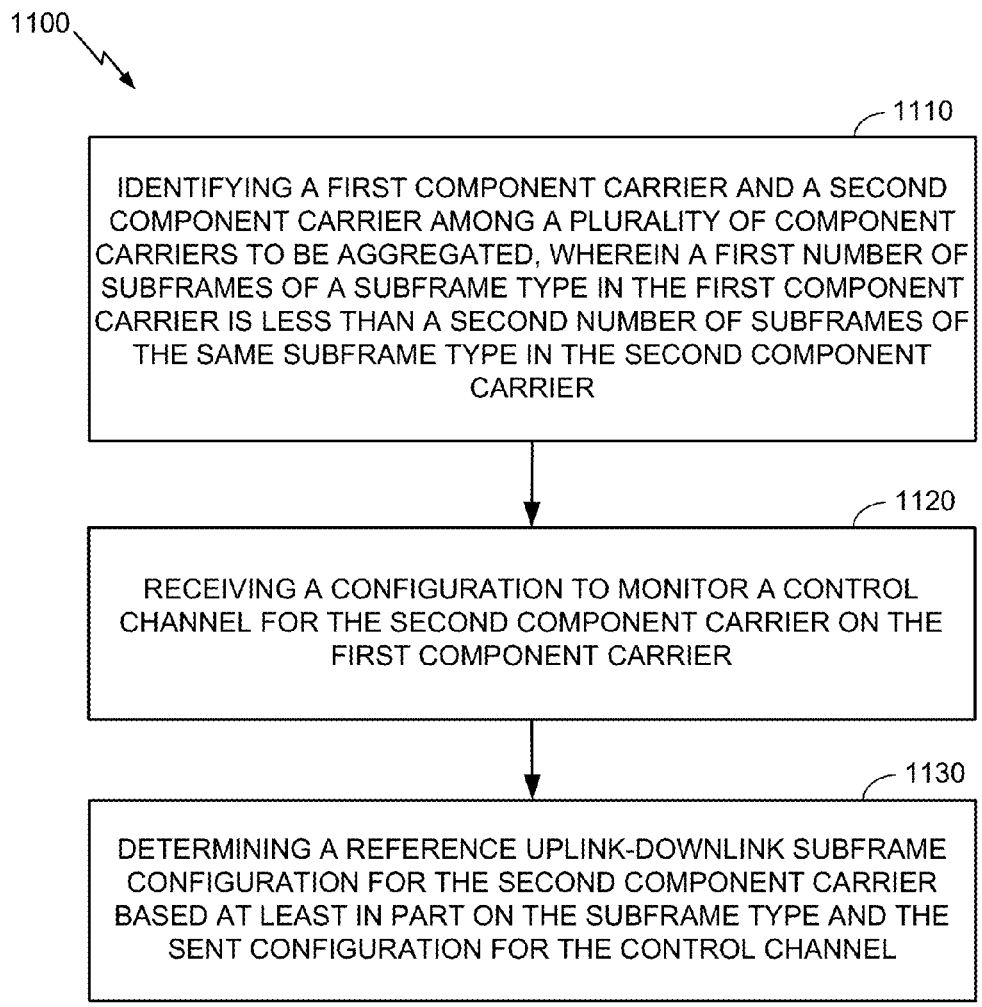
FIGS. 11A-C illustrate aspects of an example methodology for carrier aggregation operable by a mobile device.

In accordance with one or more aspects of the embodiments described herein, with reference to FIG. 11A, there is shown a methodology 1100, operable by a mobile device or the like. Specifically, the method 1100 relates to H-ARQ timing and may involve, at 1110, identifying a first component carrier and a second component carrier among a plurality of component carriers to be aggregated, wherein a first number of subframes of a subframe type in the first component carrier is less than a second number of subframes of the same subframe type in the second component carrier. The method 1100 may involve, at 1120, receiving a configuration to monitor a control channel for the second component carrier on the first component carrier. The method 1100 may involve, at 1130, determining a reference uplink-downlink subframe configuration for the second component carrier based at least in part on the subframe type and the received configuration for the control channel.

Figure 11B:
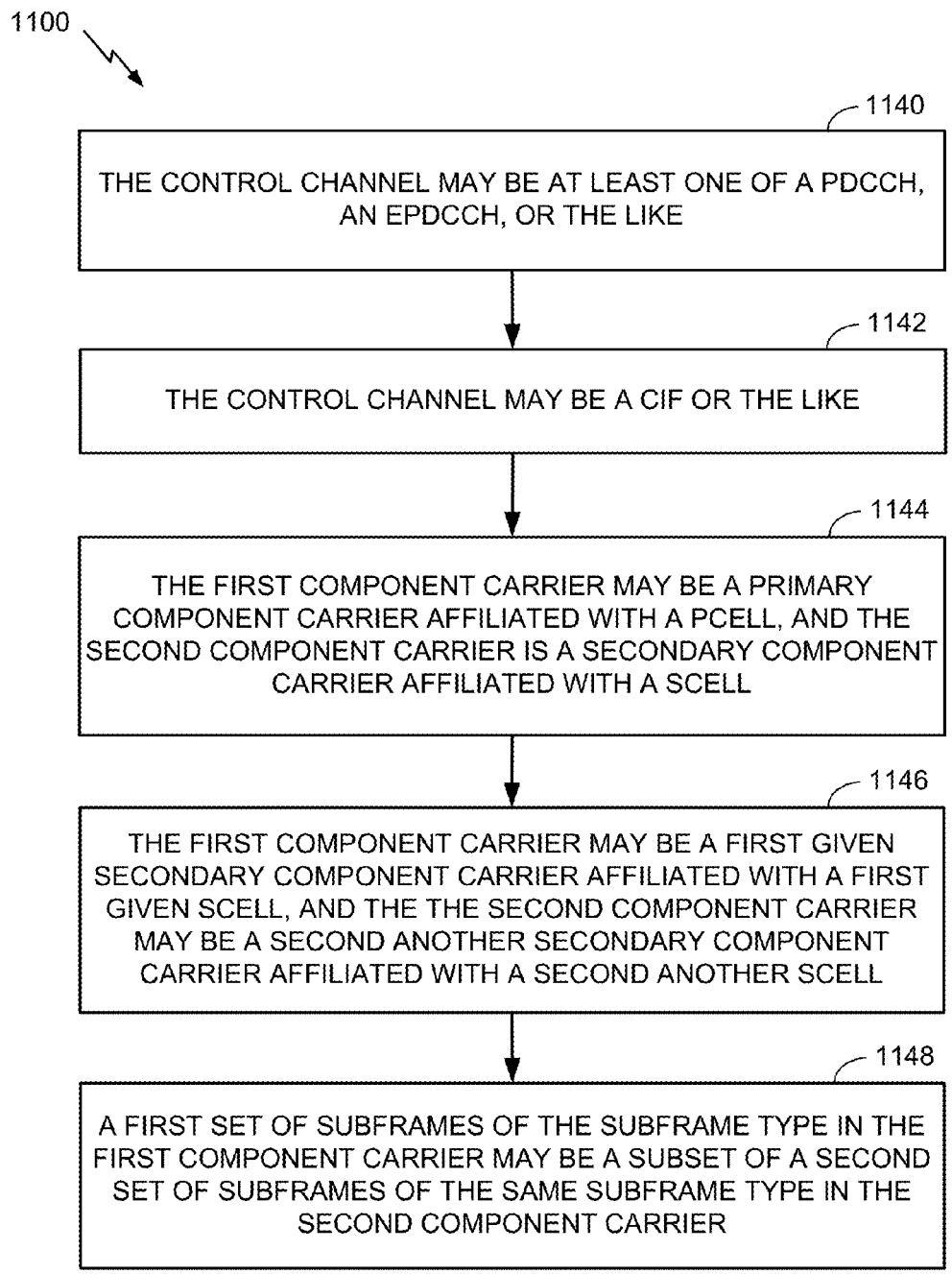
Figure 11C:
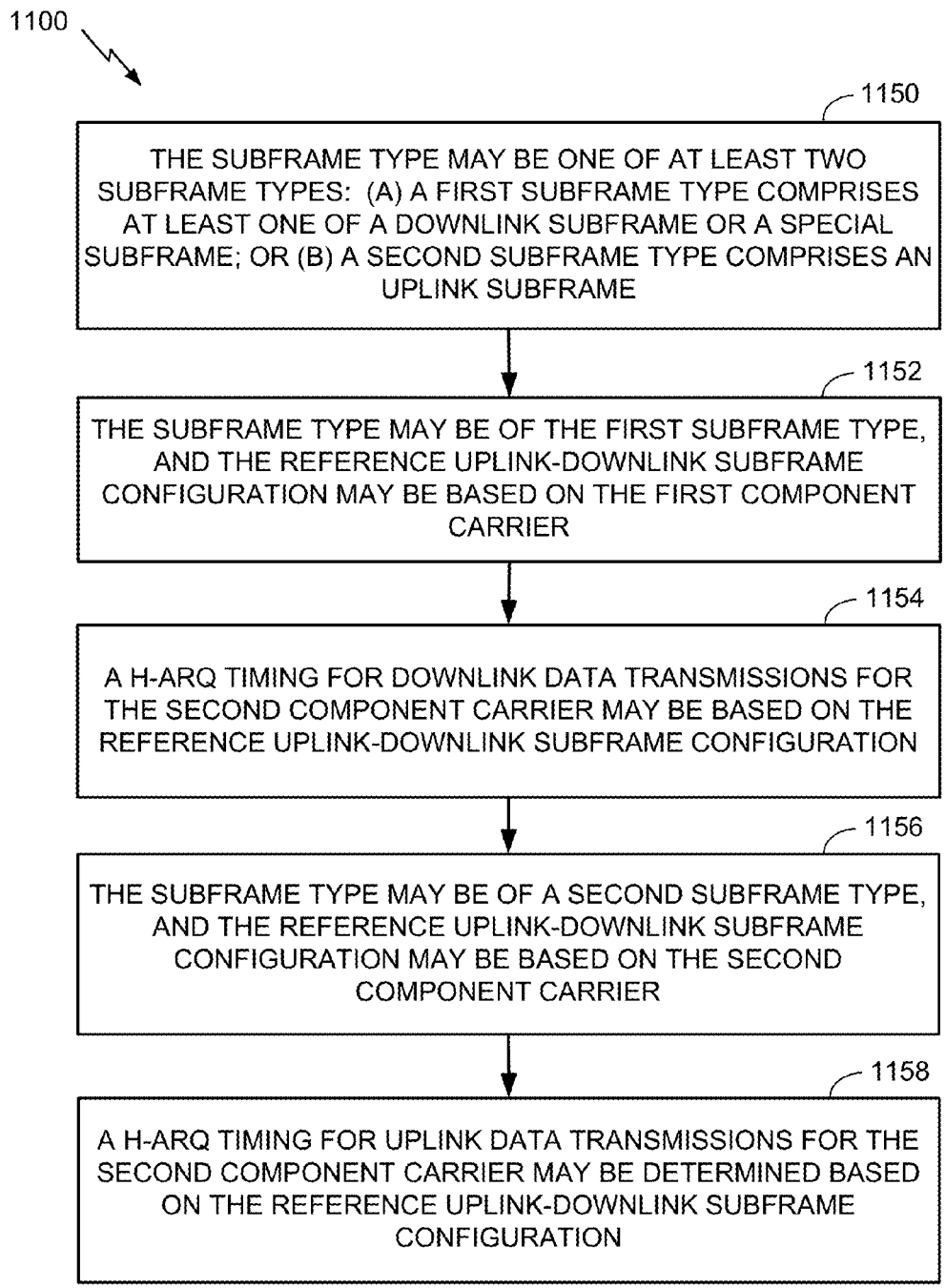

Additional operations for H-ARQ timing are illustrated in FIGS. 11B-C. One or more of the operations/features in FIGS. 11B-C may optionally be performed or included as part of method 1100. For example, the control channel may be at least one of a PDCCH, an enhanced PDCCH (EPDCCH), or the like (block 1140), as shown in FIG. 11B. The control channel may be a carrier indication field (CIF) or the like (block 1142).

In one example, the first component carrier may be a primary component carrier affiliated with a PCell, and the second component carrier is a secondary component carrier affiliated with a SCell (block 1144).

In another example, the first component carrier may be a given secondary component carrier affiliated with a given SCell, and the second component carrier may be a another secondary component carrier affiliated with a another SCell (block 1146).

A first set of subframes of the subframe type in the first component carrier may be a subset of a second set of subframes of the same subframe type in the second component carrier (block 1148).

With reference to FIG. 11C, the subframe type may be one of at least two subframe types: (a) a first subframe type comprises at least one of a downlink subframe or a special subframe; or (b) a second subframe type comprises an uplink subframe (block 1150). In one example, the subframe type may be of the first subframe type, and the reference uplink-downlink subframe configuration may be based on the first component carrier (block 1152). A H-ARQ timing for downlink data transmissions for the second component carrier may be based on the reference uplink-downlink subframe configuration (block 1154).

In another example, the subframe type may be of a second subframe type, and the reference uplink-downlink subframe configuration may be based on the second component carrier (block 1156). A H-ARQ timing for uplink data transmissions for the second component carrier may be determined based on the reference uplink-downlink subframe configuration (block 1158).

Figure 12:
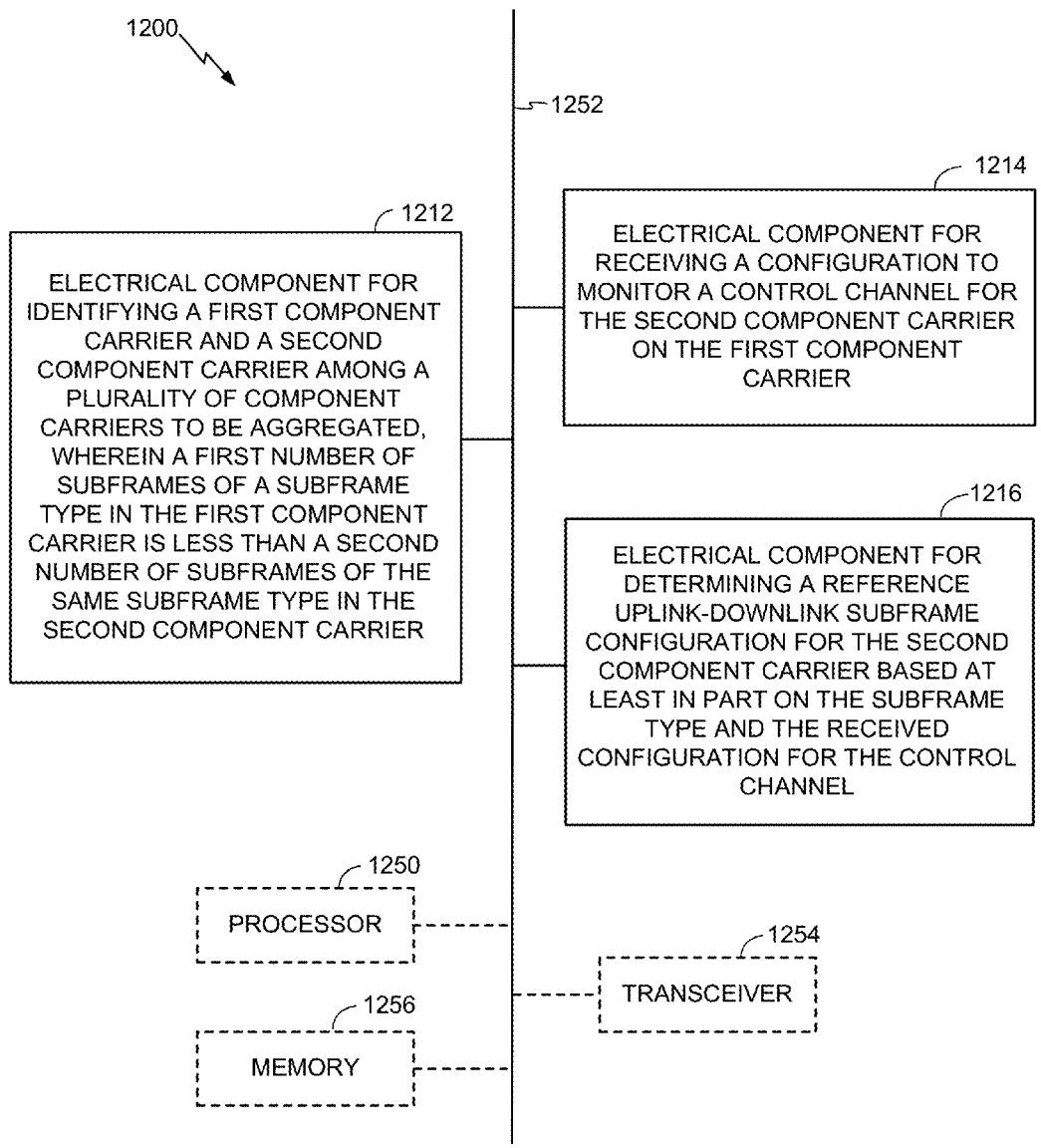
FIG. 12 shows an embodiment of an apparatus for carrier aggregation, in accordance with the methodologies of FIGS. 11A-C.

FIG. 12 shows an example apparatus for H-ARQ timing, in accordance with the methodologies of FIGS. 11A-C. With reference to FIG. 12, there is provided an exemplary apparatus 1200 that may be a mobile device in a wireless network, or as a processor or similar device/component within the mobile device. The apparatus 1200 may include functional blocks that represent functions implemented by a processor, software, or combination thereof (e.g., firmware). For example, the apparatus 1200 may include an electrical component or module 1212 for identifying a first component carrier and a second component carrier among a plurality of component carriers to be aggregated, wherein a first number of subframes of a subframe type in the first component carrier is less than a second number of subframes of the same subframe type in the second component carrier. For example, the component 1212 may include the controller/processor 380 and/or the memory 382 of the UE 120, as shown in FIG. 3.

The apparatus 1200 may also include a component 1214 for receiving a configuration to monitor a control channel for the second component carrier on the first component carrier. For example, the component 1214 may include the receive processor 328 and/or the MIMO detector 356, as shown in FIG. 3. The apparatus 1200 may also include a component 1216 for determining a reference uplink-downlink subframe configuration for the second component carrier based at least in part on the subframe type and the received configuration for the control channel. For example, the component 1216 may include the controller/processor 380 and/or the memory 382, as shown in FIG. 3. For the sake of conciseness, the rest of the details regarding apparatus 1200 are not further elaborated on; however, it is to be understood that the remaining features and aspects of the apparatus 1200 are substantially similar to those described above with respect to apparatus 1000 of FIGS. 10A-B.

Figure 13:
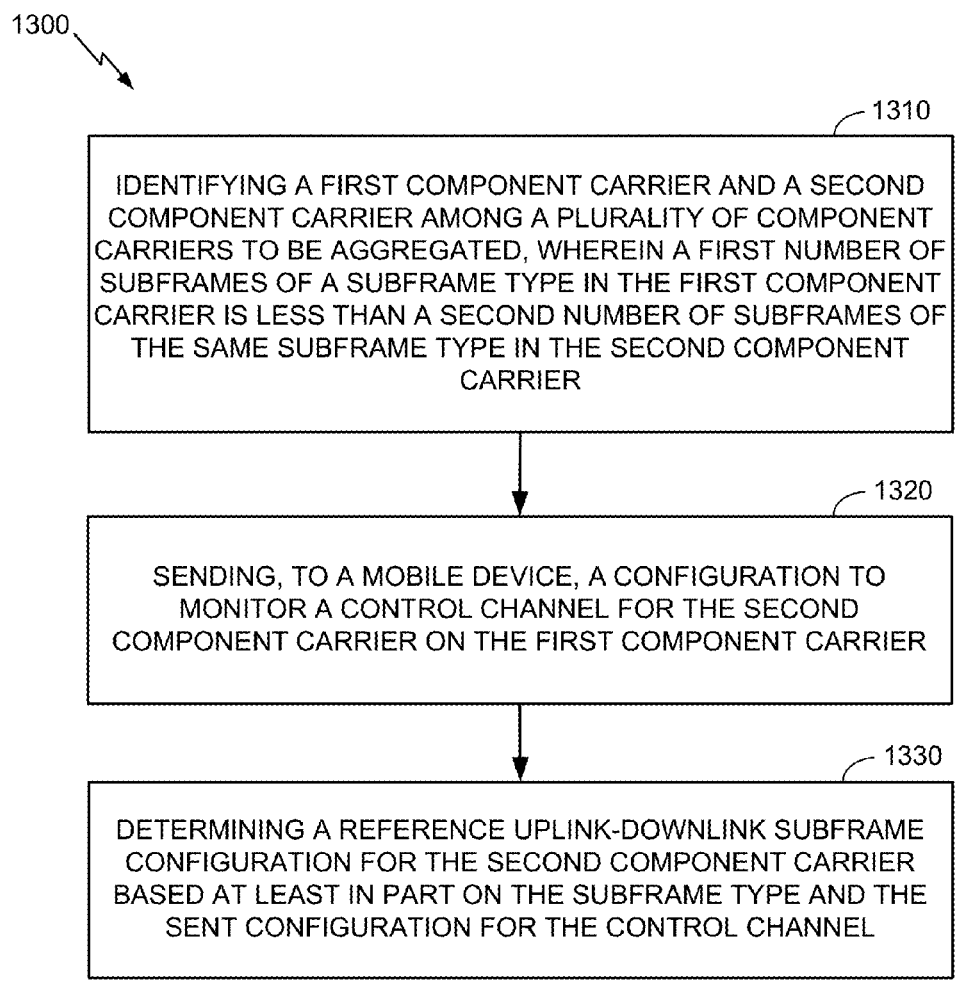
FIG. 13 illustrates aspects of an example methodology for carrier aggregation operable by a network entity.

In accordance with one or more aspects of the embodiments described herein, with reference to FIG. 13, there is shown a methodology 1300, operable by a network entity, such as an eNB, core network entity, or the like. The method 1300 relates to H-ARQ timing and may involve, at 1310, identifying a first component carrier and a second component carrier among a plurality of component carriers to be aggregated, wherein a first number of subframes of a subframe type in the first component carrier is less than a second number of subframes of the same subframe type in the second component carrier. The method 1300 may involve, at 1320, sending, to a mobile device, a configuration to monitor a control channel for the second component carrier on the first component carrier. The method 1300 may involve, at 1330, determining a reference uplink-downlink subframe configuration for the second component carrier based at least in part on the subframe type and the sent configuration for the control channel.

Figure 14:
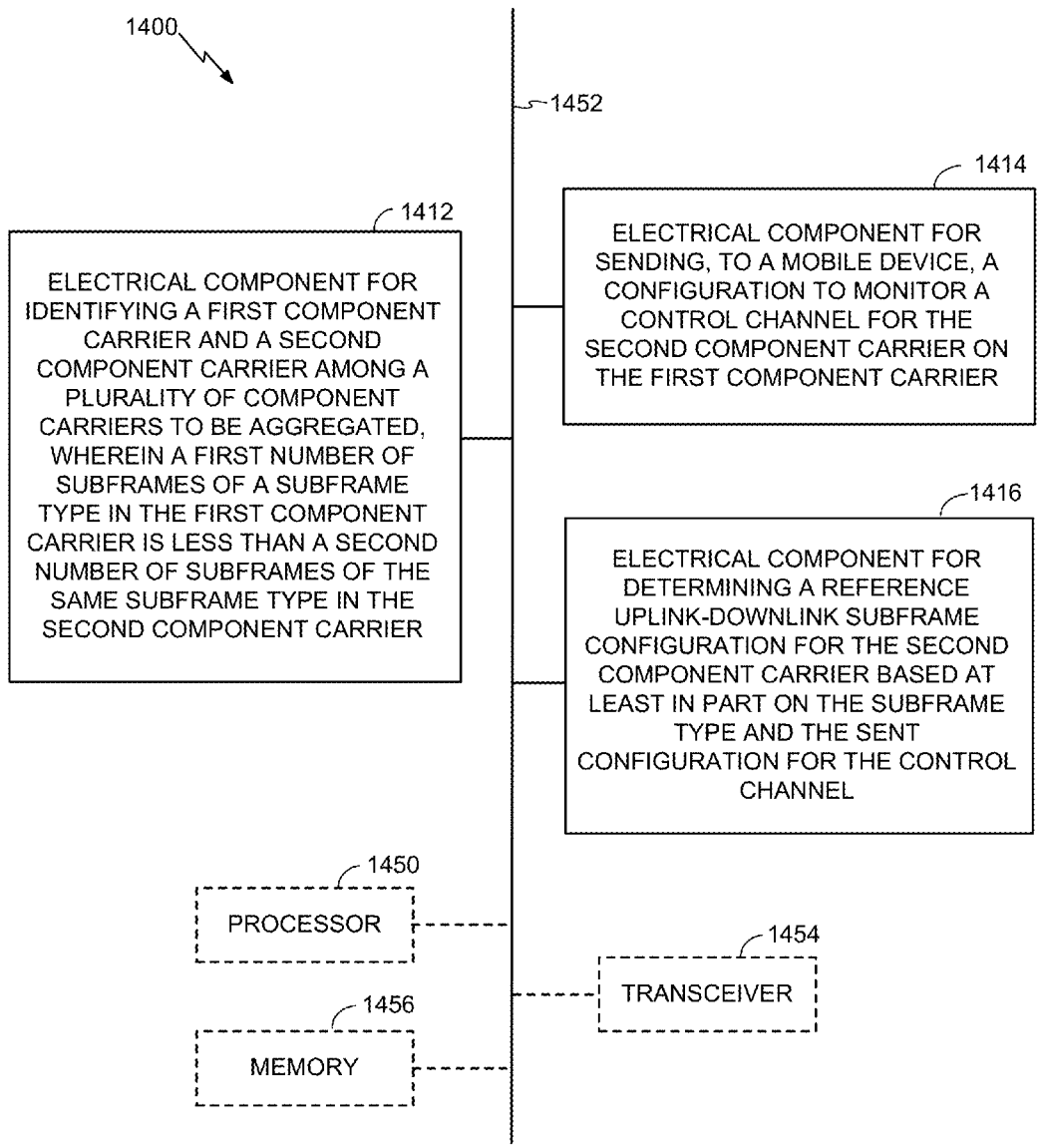
FIG. 14 shows an embodiment of an apparatus for carrier aggregation, in accordance with the methodology of FIG. 13.

FIG. 14 shows an example apparatus for H-ARQ timing, in accordance with the methodology of FIG. 13. With reference to FIG. 14, there is provided an exemplary apparatus 1400 that may be a network entity (e.g., eNB, base station, core network entity, or the like) in a wireless network, or as a processor or similar device/component within the network entity. The apparatus 1400 may include functional blocks that represent functions implemented by a processor, software, or combination thereof (e.g., firmware). For example, the apparatus 1400 may include an electrical component or module 1412 for identifying a first component carrier and a second component carrier among a plurality of component carriers to be aggregated, wherein a first number of subframes of a subframe type in the first component carrier is less than a second number of subframes of the same subframe type in the second component carrier. For example, the component 1412 may include the controller/processor 340, the scheduler 344, and/or the memory 322 of the eNB 110, as shown in FIG. 3.

The apparatus 1400 may include an electrical component 1414 for sending, to a mobile device, a configuration to monitor a control channel for the second component carrier on the first component carrier. For example, the component 1414 may include transmit processor 320, the TX MIMO processor 330, the data source 312, and/or the scheduler 344. The apparatus 1400 may include an electrical component 1416 for determining a reference uplink-downlink subframe configuration for the second component carrier based at least in part on the subframe type and the sent configuration for the control channel. For example, the component 1416 may include the controller/processor 340, the scheduler 344, and/or the memory 322. For the sake of conciseness, the rest of the details regarding apparatus 1400 are not further elaborated on; however, it is to be understood that the remaining features and aspects of the apparatus 1400 are substantially similar to those described above with respect to apparatus 1000 of FIGS. 10A-B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for carrier aggregation operable by a mobile device in a wireless communication network, the method comprising:
    identifying a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
    receiving, on the first component carrier, a configuration to monitor a control channel for the second component carrier;
    determining a reference uplink-downlink subframe configuration for the second component carrier based at least in part on the subframe type and the received configuration for the control channel; and
    determining whether a hybrid automatic repeat request (H-ARQ) timing for data transmissions for the second component carrier follows a H-ARQ timing of the first cell or a H-ARQ timing of the second cell based at least in part on a format of an uplink control channel.

2. The method of claim 1, wherein the control channel is at least one of a physical downlink control channel (PDCCH) or an enhanced PDCCH (EPDCCH).

3. The method of claim 1, wherein the control channel comprises a carrier indication field (CIF).

4. The method of claim 1, wherein:
    the first component carrier is a primary component carrier and the first cell L a primary cell (PCell); and
    the second component carrier is a secondary component carrier and the second cell a secondary cell (SCell).

5. The method of claim 1, wherein:
    the first component carrier is a given secondary component carrier and the first cell is a given secondary cell (SCell); and
    the second component carrier is another secondary component carrier and the second cell is another SCell.

6. The method of claim 1, wherein a first set of subframes of the subframe type in the first component carrier is a subset of a second set of subframes of the same subframe type in the second component carrier.

7. The method of claim 1, wherein the subframe type is one of at least two subframe types, wherein:
    a first subframe type comprises at least one of a downlink subframe or a special subframe; or
    a second subframe type comprises an uplink subframe.

8. The method of claim 7, wherein the subframe type is of the first subframe type, and the reference uplink-downlink subframe configuration is based on the first component carrier.

9. The method of claim 7, wherein the subframe type is of a second subframe type, and the reference uplink-downlink subframe configuration is based on the second component carrier.

10. An apparatus, comprising:
    means for identifying a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
    means for receiving, on the first component carrier, a configuration to monitor a control channel for the second component carrier;
    means for determining a reference uplink-downlink subframe configuration for the second component carrier based at least in part on the subframe type and the received configuration for the control channel; and
    means for determining whether a hybrid automatic repeat request (H-ARQ) timing for transmissions for the second component carrier follows a H-ARQ timing of the first cell or a H-ARQ timing of the second cell based at least in part on a format of an uplink control channel.

11. The apparatus of claim 10, wherein the control channel is at least one of a physical downlink control channel (PDCCH) or an enhanced PDCCH (EPDCCH).

12. The apparatus of claim 10, wherein a first set of subframes of the subframe type in the first component carrier is a subset of a second set of subframes of the same subframe type in the second component carrier.

13. The apparatus of claim 10, wherein the subframe type can be one of at least two subframe types, wherein:
  a first subframe type comprises at least one of a downlink subframe or a special subframe; and
  a second subframe type comprises an uplink subframe.

14. An apparatus, comprising:
  at least one processor configured to identify a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier; and
  a radio transceiver configured to receive, on the first component carrier, a configuration to monitor a control channel for the second component carrier;
  wherein the at least one processor is configured to determine a reference uplink-downlink subframe configuration for the second component carrier based at least in part on the subframe type and the received configuration for the control channel and determine whether a hybrid automatic repeat request (H-ARQ) timing for transmissions for the second component carrier follows a H-ARQ timing of the first cell or a H-ARQ timing of the second cell based at least in part on a format of an uplink control channel.

15. A non-transitory computer-readable medium comprising code for causing a computer to:
  identify a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
  receive, on the first component carrier, a configuration to monitor a control channel for the second component carrier;
  determine a reference uplink-downlink subframe configuration for the second component carrier based at least in part on the subframe type and the received configuration for the control channel; and
  determine whether a hybrid automatic repeat request (H-ARQ) timing for data transmissions for the second component carrier follows a H-ARQ timing of the first cell or a H-ARQ timing of the second cell based at least in part on a format of an uplink control channel.

16. A method for carrier aggregation operable by a network entity in a wireless communication network, the method comprising:
  identifying a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
  sending, to a mobile device, a configuration, on the first component carrier, to monitor a control channel for the second component carrier;
  determining a reference uplink-downlink subframe configuration for the second component carrier based at least in part on the subframe type and the sent configuration for the control channel; and
  determining whether a hybrid automatic repeat request (H-ARQ) timing for data transmissions for the second component carrier follows a H-ARQ timing of the first cell or a H-ARQ timing of the second cell based at least in part on a format of an uplink control channel.

17. The method of claim 16, wherein the control channel is at least one of a physical downlink control channel (PDCCH) or an enhanced PDCCH (EPDCCH).

18. The method of claim 16, wherein the control channel comprises a carrier indication field (CIF).

19. The method of claim 16, wherein:
  the first component carrier is a primary component carrier and the first cell is a primary cell (PCell); and
  the second component carrier is a secondary component carrier and the second cell is a secondary cell (SCell).

20. The method of claim 16, wherein:
  the first component carrier is a given secondary component carrier and the first cell is a given secondary cell (SCell); and
  the second component carrier is another secondary component carrier and the second cell is another SCell.

21. The method of claim 16, wherein a first set of subframes of the subframe type in the first component carrier is a subset of a second set of subframes of the same subframe type in the second component carrier.

22. The method of claim 16, wherein the subframe type can be one of at least two subframe types, wherein:
  a first subframe type comprises at least one of a downlink subframe or a special subframe; and
  a second subframe type comprises an uplink subframe.

23. The method of claim 22, wherein the subframe type is of the first subframe type, and the reference uplink-downlink subframe configuration is based on the first component carrier.

24. The method of claim 22, wherein the subframe type is of a second subframe type, and the reference uplink-downlink subframe configuration is based on the second component carrier.

25. An apparatus, comprising:
  means for identifying a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
  means for sending, to a mobile device, a configuration, on the first component carrier, to monitor a control channel for the second component carrier;
  means for determining a reference uplink-downlink subframe configuration for the second component carrier based at least in part on the subframe type and the sent configuration for the control channel; and
  means for determining whether a hybrid automatic repeat request (H-ARQ) timing for data transmissions for the second component carrier follows a H-ARQ timing of the first cell or a H-ARQ timing of the second cell based at least in part on a format of an uplink control channel.

26. The apparatus of claim 25, wherein the control channel is at least one of a physical downlink control channel (PDCCH) or an enhanced PDCCH (EPDCCH).

27. The apparatus of claim 25, wherein a first set of subframes of the subframe type in the first component carrier is a subset of a second set of subframes of the same subframe type in the second component carrier.

28. The apparatus of claim 25, wherein the subframe type can be one of at least two subframe types, wherein:
   a first subframe type comprises at least one of a downlink subframe or a special subframe; and
   a second subframe type comprises an uplink subframe.

29. An apparatus, comprising:
   at least one processor configured to identify a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier; and
   a radio transceiver configured to send, to a mobile device, a configuration, on the first component carrier, to monitor a control channel for the second component carrier; and
   wherein the at least one processor is configured to determine a reference uplink-downlink subframe configuration for the second component carrier based at least in part on the subframe type and the sent configuration for the control channel and determine whether a hybrid automatic repeat request (H-ARQ) timing for transmissions for the second component carrier follows a H-ARQ timing of the first cell or a H-ARQ timing of the second cell based at least in part on a format of an uplink control channel.

30. A non-transitory computer-readable medium comprising code for causing a computer to:
   identify a first component carrier, affiliated with a first cell, and a second component carrier, affiliated with a second cell, among a plurality of component carriers to be aggregated, wherein a first number of subframes of a subframe type in the first component carrier is less than a second number of subframes of the same subframe type in the second component carrier;
   send, to a mobile device, a configuration, on the first component carrier, to monitor a control channel for the second component carrier;
   determine a reference uplink-downlink subframe configuration for the second component carrier based at least in part on the subframe type and the sent configuration for the control channel; and
   determine whether a hybrid automatic repeat request (H-ARQ) timing for data transmissions for the second component carrier follows a H-ARQ timing of the first cell or a H-ARQ timing of the second cell based at least in part on a format of an uplink control channel.

* * * * *